United States Patent
Boggio

(10) Patent No.: US 11,594,082 B2
(45) Date of Patent: *Feb. 28, 2023

(54) VEHICLE FAULT DETECTION SYSTEM AND METHOD UTILIZING GRAPHICALLY CONVERTED TEMPORAL DATA

(71) Applicant: The Boeing Company, Chicago, IL (US)

(72) Inventor: John M. Boggio, Columbia, IL (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/648,240

(22) Filed: Jan. 18, 2022

(65) Prior Publication Data

US 2022/0139127 A1 May 5, 2022

Related U.S. Application Data

(63) Continuation of application No. 15/795,855, filed on Oct. 27, 2017, now Pat. No. 11,263,835.

(51) Int. Cl.
    *G07C 5/08*      (2006.01)
    *G05B 23/02*      (2006.01)
    (Continued)

(52) U.S. Cl.
    CPC ....... *G07C 5/0808* (2013.01); *G05B 23/0221* (2013.01); *G05B 23/0254* (2013.01);
    (Continued)

(58) Field of Classification Search
    CPC ...... G07C 5/0808; G07C 5/0825; G06N 3/08; G06T 11/206
    (Continued)

(56) References Cited

U.S. PATENT DOCUMENTS

| | | |
|---|---|---|
| 5,235,801 A | 8/1993 | Evenson et al. |
| 5,745,382 A | 4/1998 | Vilim et al. |

(Continued)

FOREIGN PATENT DOCUMENTS

| | | |
|---|---|---|
| CN | 106168539 | 11/2016 |
| EP | 2541358 | 1/2013 |

(Continued)

OTHER PUBLICATIONS

European Extended Search Report, European Application No. 18196205.1, dated Mar. 13, 2019.

*Primary Examiner* — Isaac G Smith
(74) *Attorney, Agent, or Firm* — Perman & Green, LLP

(57) ABSTRACT

A vehicle fault detection system including at least one sensor configured for coupling with a vehicle system, a vehicle control module coupled to the at least one sensor, and being configured to receive at least one time series of numerical sensor data from the at least one sensor, at least one of the at least one time series of numerical sensor data corresponds to a respective system parameter of the vehicle system being monitored, generate a graphical representation for the at least one time series of numerical sensor data to form an analysis image of at least one system parameter, and detect anomalous behavior of a component of the vehicle system based on the analysis image, and a user interface coupled to the vehicle control module, the user interface being configured to present to an operator an indication of the anomalous behavior for the component of the vehicle system.

20 Claims, 15 Drawing Sheets

(51) Int. Cl.
*G06N 3/08* (2023.01)
*G06T 11/20* (2006.01)
(52) U.S. Cl.
CPC .............. *G06N 3/08* (2013.01); *G06T 11/206* (2013.01); *G07C 5/0825* (2013.01)
(58) Field of Classification Search
USPC ......................................................... 70/29.6
See application file for complete search history.

(56) References Cited

U.S. PATENT DOCUMENTS

| | | | |
|---|---|---|---|
| 7,243,048 B2 * | 7/2007 | Foslien | G05B 23/024 |
| | | | 701/99 |
| 10,395,444 B1 | 8/2019 | Edren et al. | |
| 2015/0345325 A1 | 12/2015 | Khibnik | |
| 2016/0176538 A1 | 6/2016 | Bekanich | |
| 2017/0261545 A1 | 9/2017 | Federley et al. | |
| 2017/0357828 A1 * | 12/2017 | Phillips | G06F 40/40 |
| 2018/0173214 A1 | 6/2018 | Higgins et al. | |
| 2018/0348250 A1 | 12/2018 | Higgins et al. | |

FOREIGN PATENT DOCUMENTS

| | | |
|---|---|---|
| WO | 9708627 | 3/1997 |
| WO | 2016025887 | 2/2016 |

\* cited by examiner

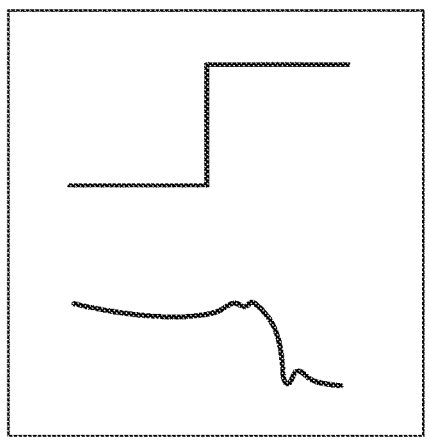
180Cl2　FIG.3A
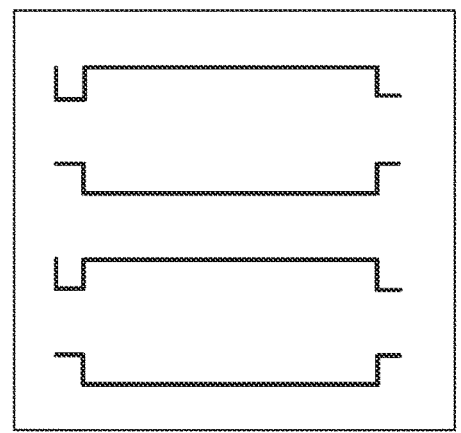
180Cl　FIG.3B
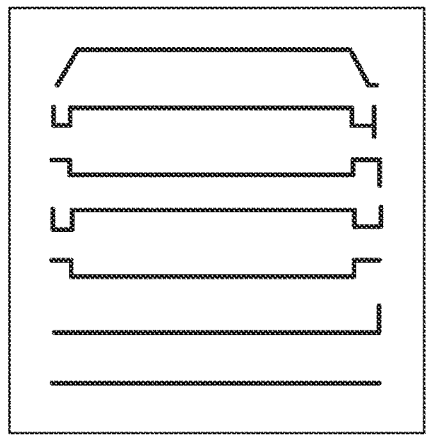
180Cl7　FIG.3C
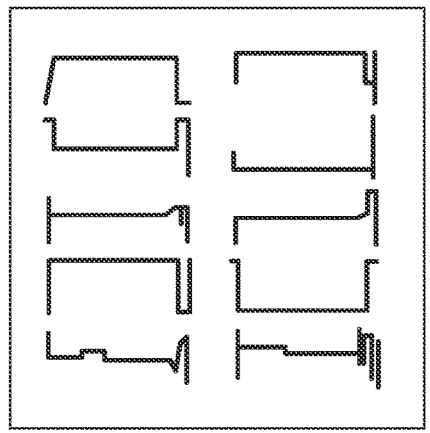
180Cl10　FIG.3D

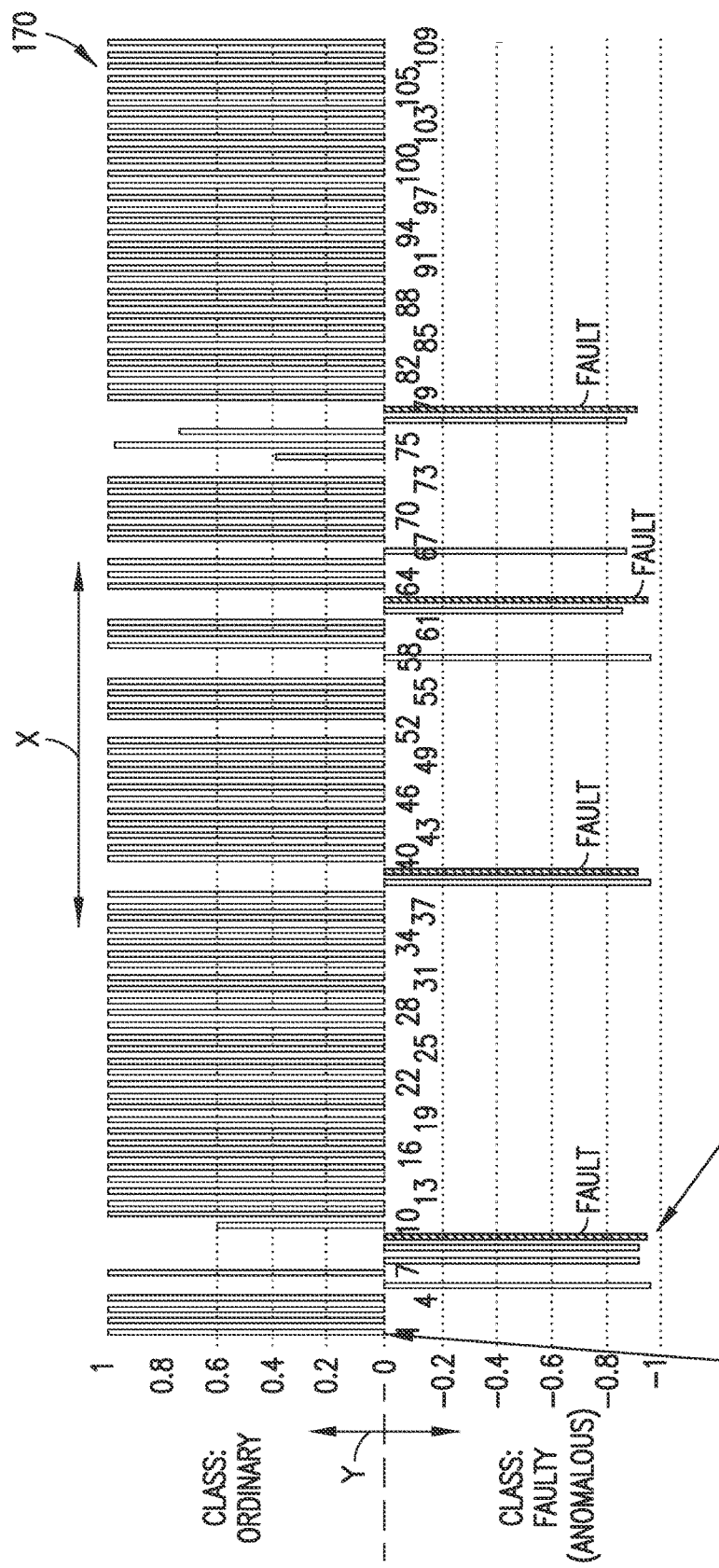
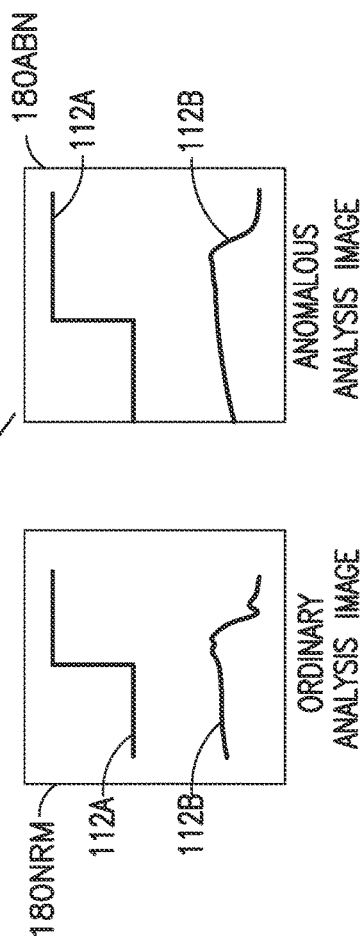
FIG. 8

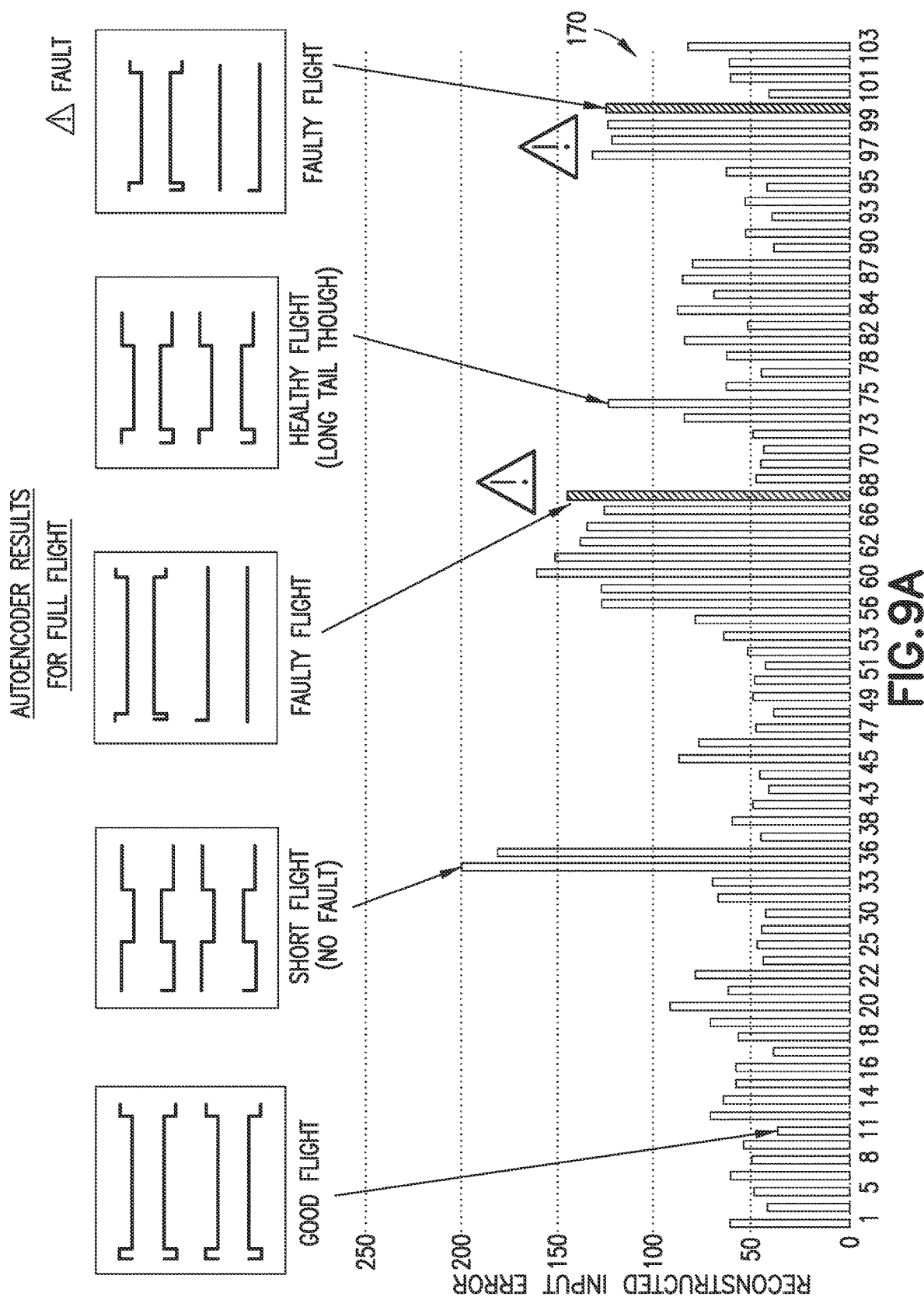

VEHICLE FAULT DETECTION SYSTEM AND METHOD UTILIZING GRAPHICALLY CONVERTED TEMPORAL DATA

CROSS-REFERENCE TO RELATED APPLICATIONS

This application is a continuation of and claims the benefit of U.S. patent application Ser. No. 15/795,855 filed on Oct. 27, 2017 (now U.S. Pat. No. 11,263,835, issued Mar. 1, 2022), the disclosure of which is incorporated herein by reference in its entirety.

BACKGROUND

1. Field

The exemplary embodiments generally relate to fault detection and in particular to fault detection by graphically converting temporal data.

2. Brief Description of Related Developments

Generally, fault detection in vehicles such as aircraft is performed using some form of statistical analysis. Generally digital sensor data is obtained in a time series of sensor data and is converted into a mathematical form for statistical (or other) processing using, for example, machine learning based solutions. These machine learning based solutions extract statistical measures, known as features, from a dataset, such as the time series of sensor data. Examples of the features include a minimum, a maximum, or an average parameter value over the course of an entire vehicle excursion (which in the case of an aircraft is an entire flight). Values for the features are compared across a series of vehicle excursions in an attempt to identify a trend in the time series of sensor data that precedes a vehicle component fault.

Generally, the features being analyzed are manually defined, which may be very time consuming. Further, the dataset that makes up the time series of sensor data is composed of tens of thousands of sensor values. With statistical analysis of the time series of sensor data, the entire dataset generally gets reduced or summarized into a single number. As such, conventional statistical vehicle fault detections systems may ignore large volumes of data and may not be able to capture subtle changes in the data or complex patterns inherent to the data (e.g., which may include relationships between vehicle components with respect to faults).

SUMMARY

Accordingly, apparatuses and methods, intended to address at least one or more of the above-identified concerns, would find utility.

The following is a non-exhaustive list of examples, which may or may not be claimed, of the subject matter according to the present disclosure.

One example of the subject matter according to the present disclosure relates to a vehicle fault detection system comprising: at least one sensor configured for coupling with a vehicle system; a vehicle control module coupled to the at least one sensor, the vehicle control module being configured to receive at least one time series of numerical sensor data from the at least one sensor, at least one of the at least one time series of numerical sensor data corresponds to a respective system parameter of the vehicle system being monitored, generate a graphical representation for the at least one time series of numerical sensor data to form an analysis image of at least one system parameter, and detect anomalous behavior of a component of the vehicle system based on the analysis image of at least one system parameter; and a user interface coupled to the vehicle control module, the user interface being configured to present to an operator an indication of the anomalous behavior for a component of the vehicle system.

Another example of the subject matter according to the present disclosure relates to a vehicle fault detection system comprising: a memory; at least one sensor coupled to the memory, the at least one sensor being configured to generate at least one time series of numerical sensor data for a respective system parameter of a vehicle system being monitored; a vehicle control module coupled to the memory, the vehicle control module being configured to transform the at least one time series of numerical sensor data for the respective system parameter into an analysis image of at least one system parameter and detect, with at least one deep learning model, anomalous behavior of the respective system parameter based on the analysis image of at least one system parameter; and a user interface coupled to the vehicle control module, the user interface being configured to present to an operator an indication of the anomalous behavior of the respective system parameter.

Still another example of the subject matter according to the present disclosure relates to a method for vehicle fault detection, the method comprising: generating, with at least one sensor coupled to a vehicle system, at least one time series of numerical sensor data for a respective system parameter of the vehicle system being monitored; transforming, with a vehicle control module coupled to the at least one sensor, the at least one time series of numerical sensor data for the respective system parameter into an analysis image of at least one system parameter; detecting, with at least one deep learning model of the vehicle control module, anomalous behavior of the respective system parameter based on the analysis image of at least one system parameter; and displaying, on a user interface coupled to the vehicle control module, an indication of the anomalous behavior of the respective system parameter.

BRIEF DESCRIPTION OF THE DRAWINGS

Figure 1:
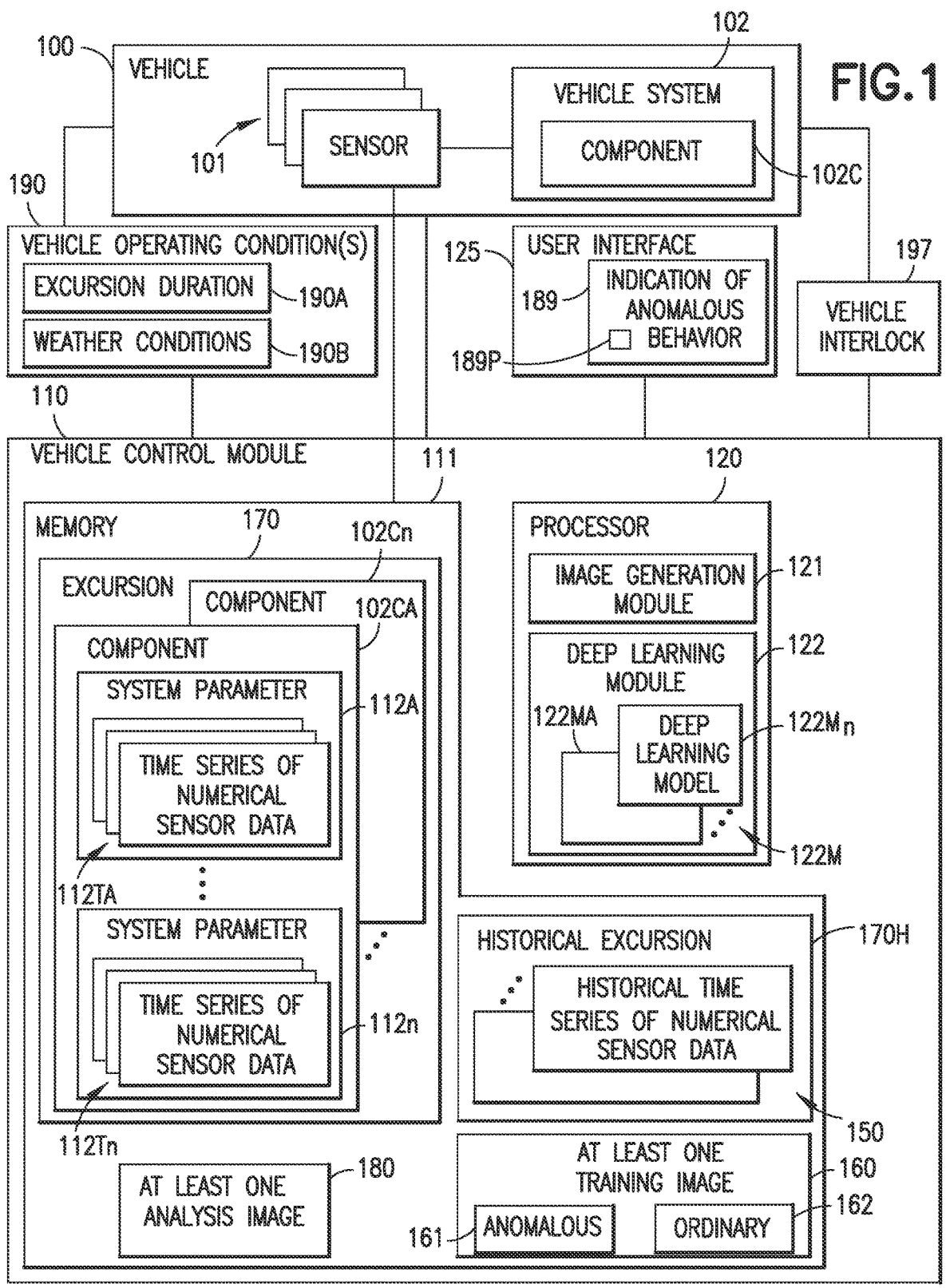
Figure 2:
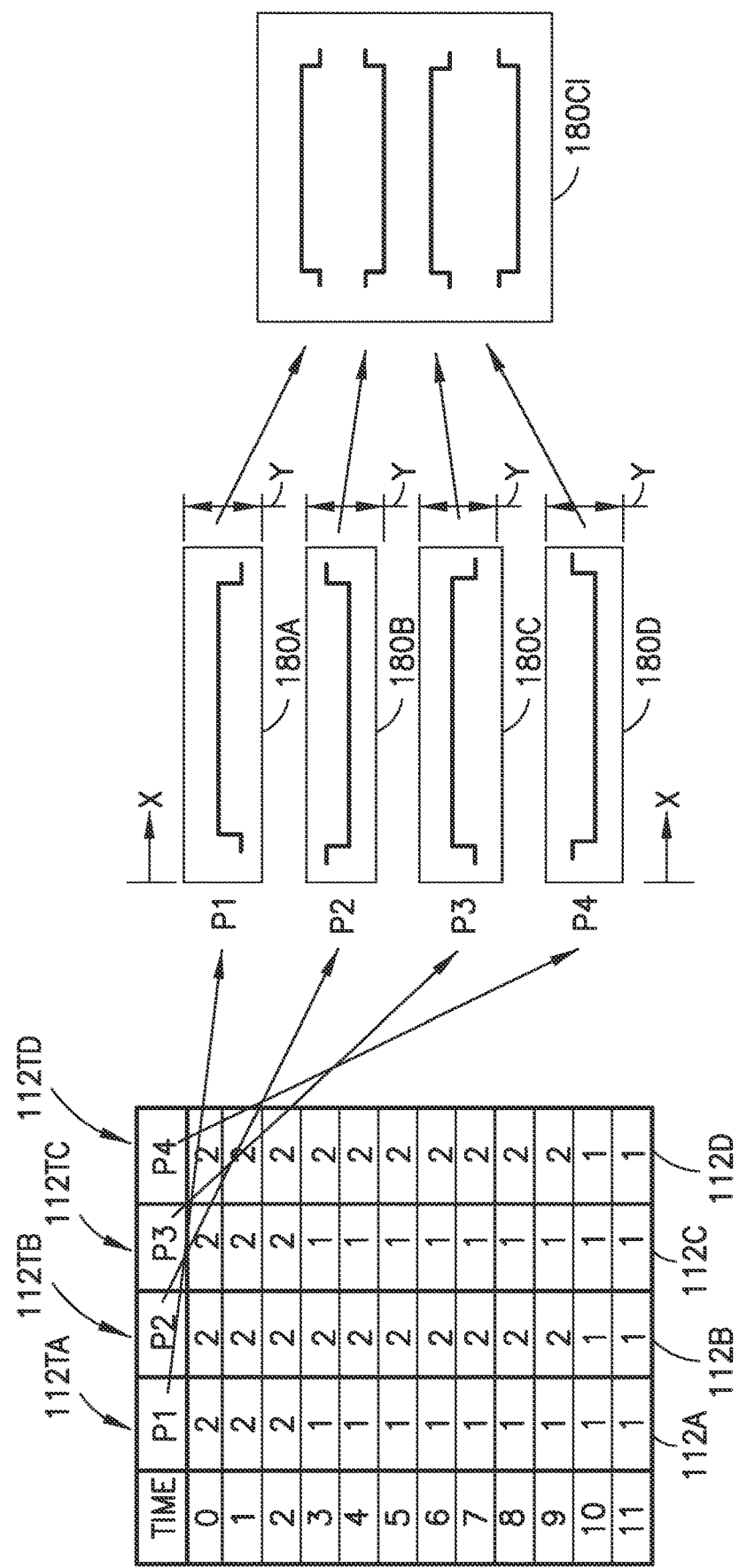
Figure 4A:
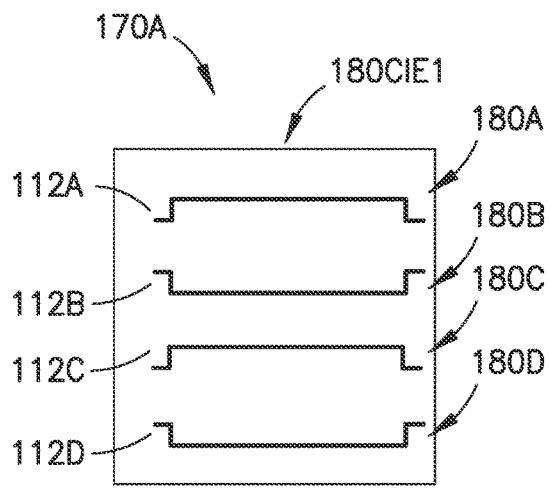
Figure 4B:
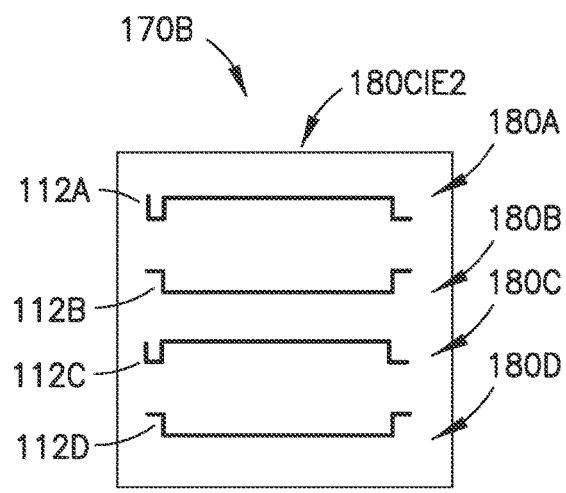
Figure 4C:
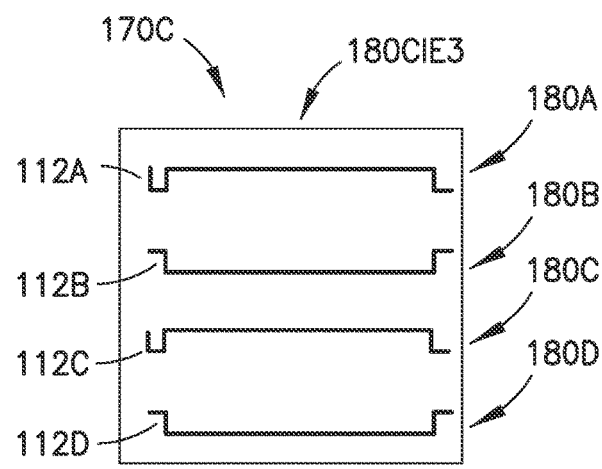
Figure 5:
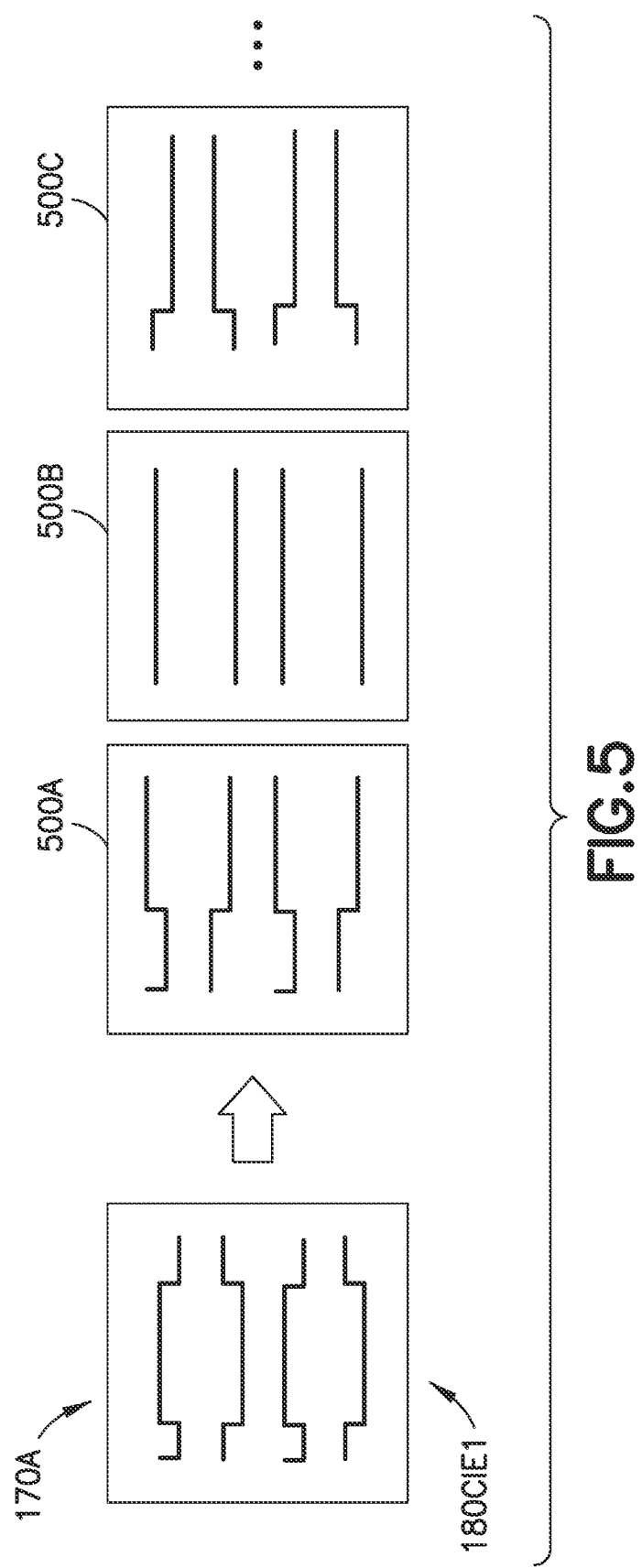
Figure 6A:
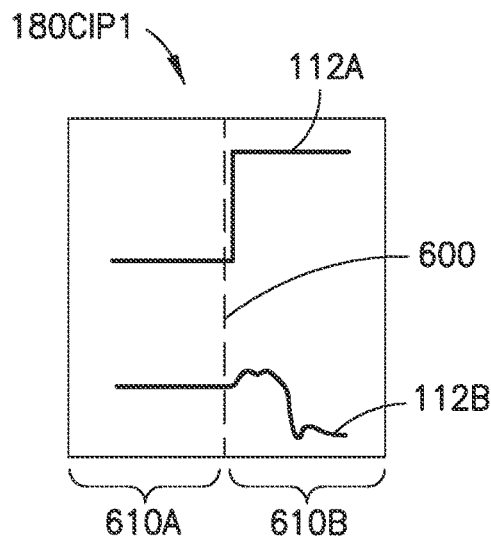
Figure 6B:
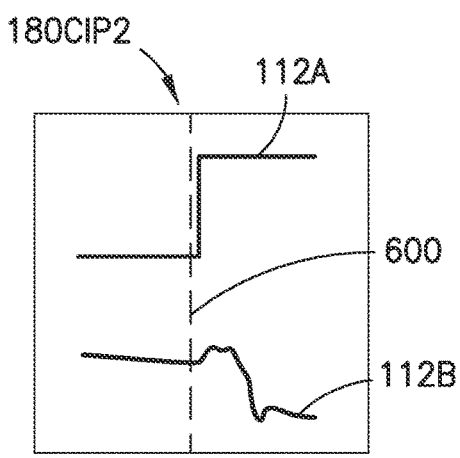
Figure 6C:
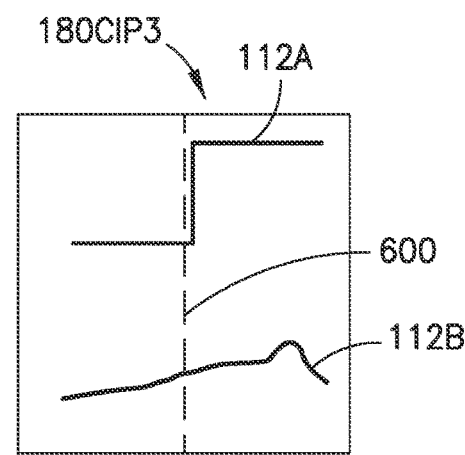
Figure 7A:
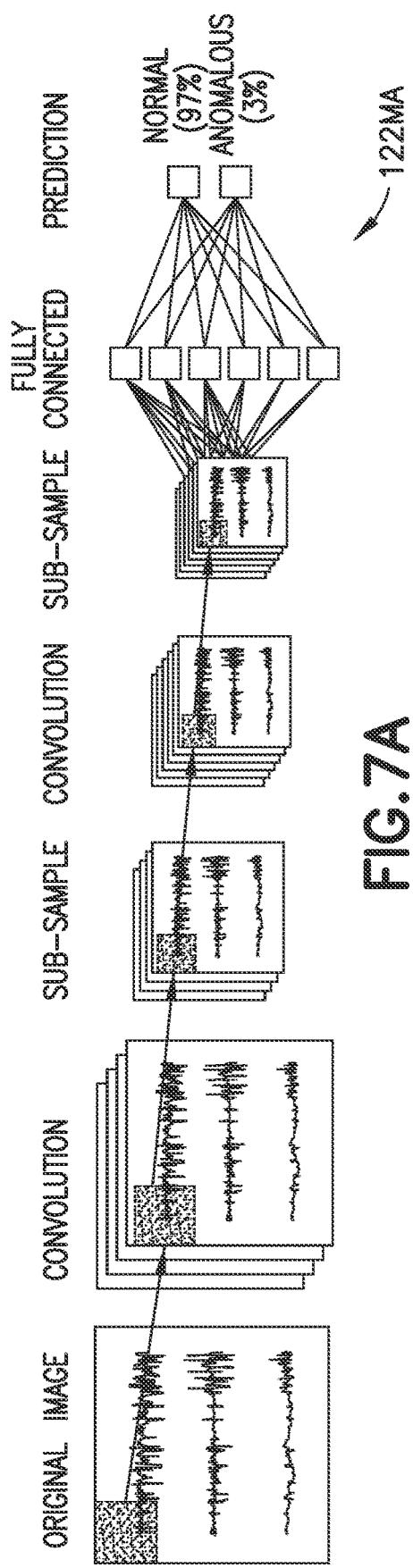
Figure 7B:
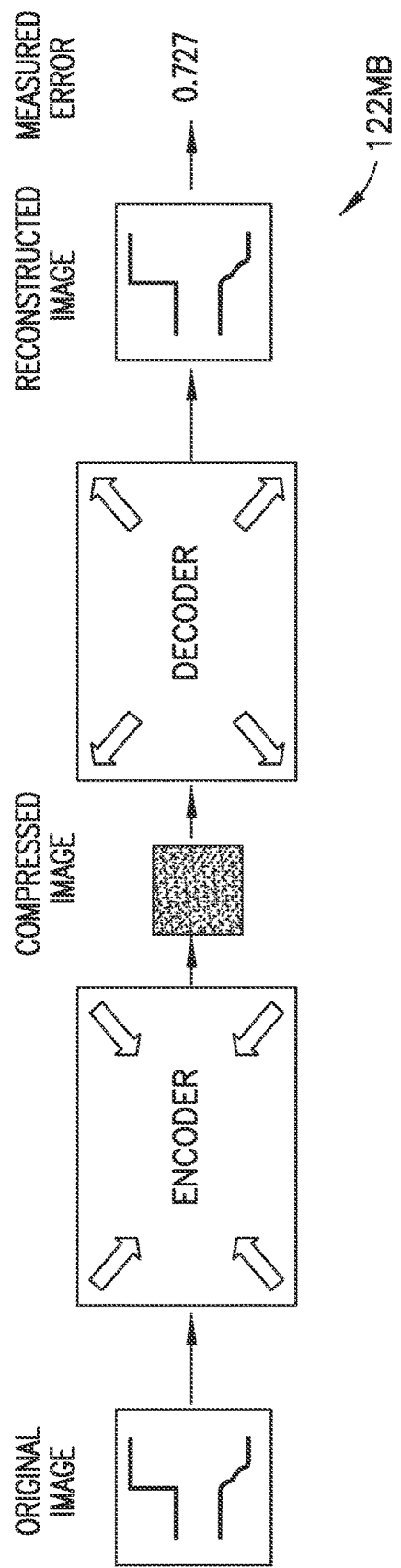
Figure 9B:
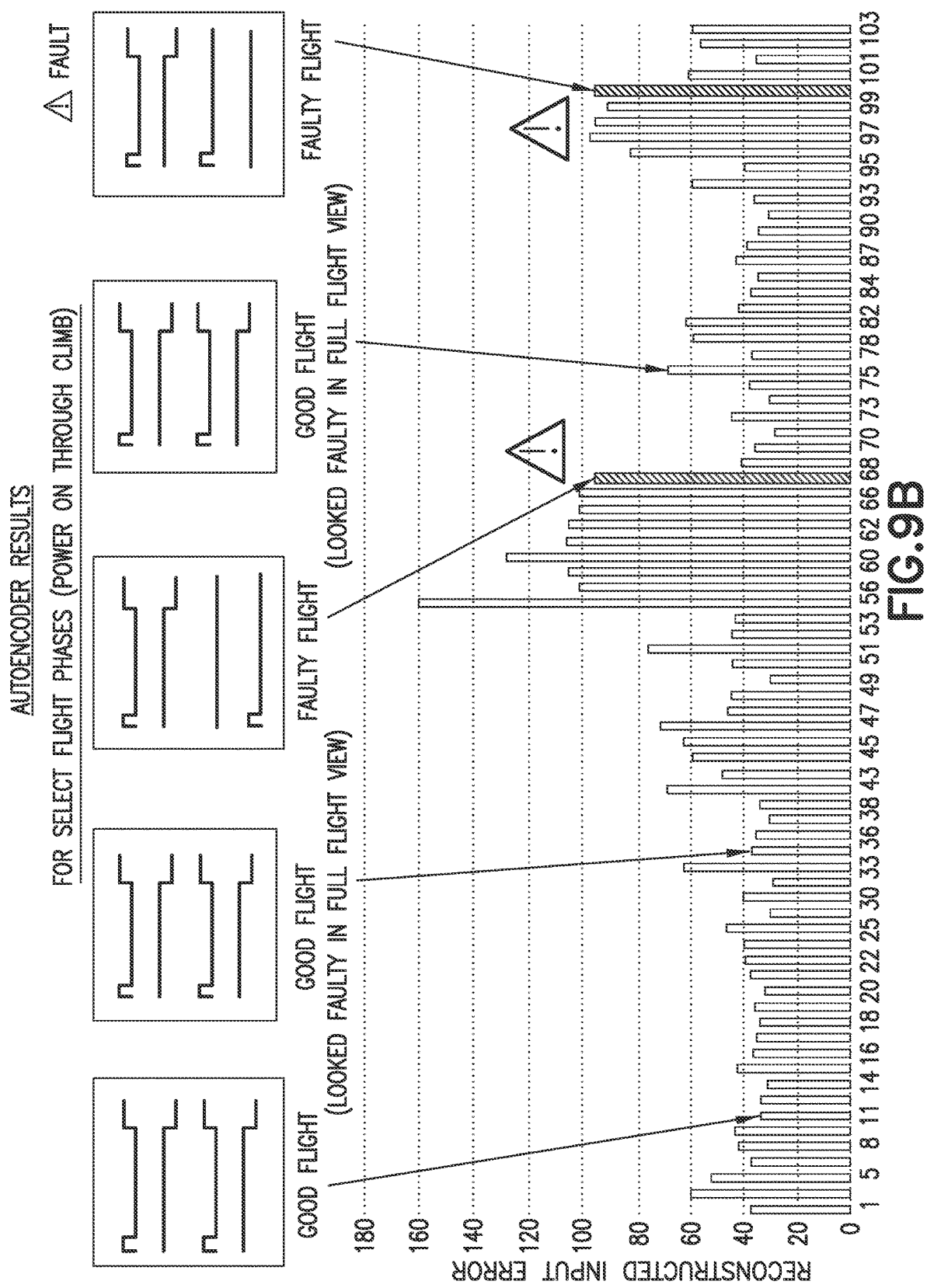
Figure 9C:
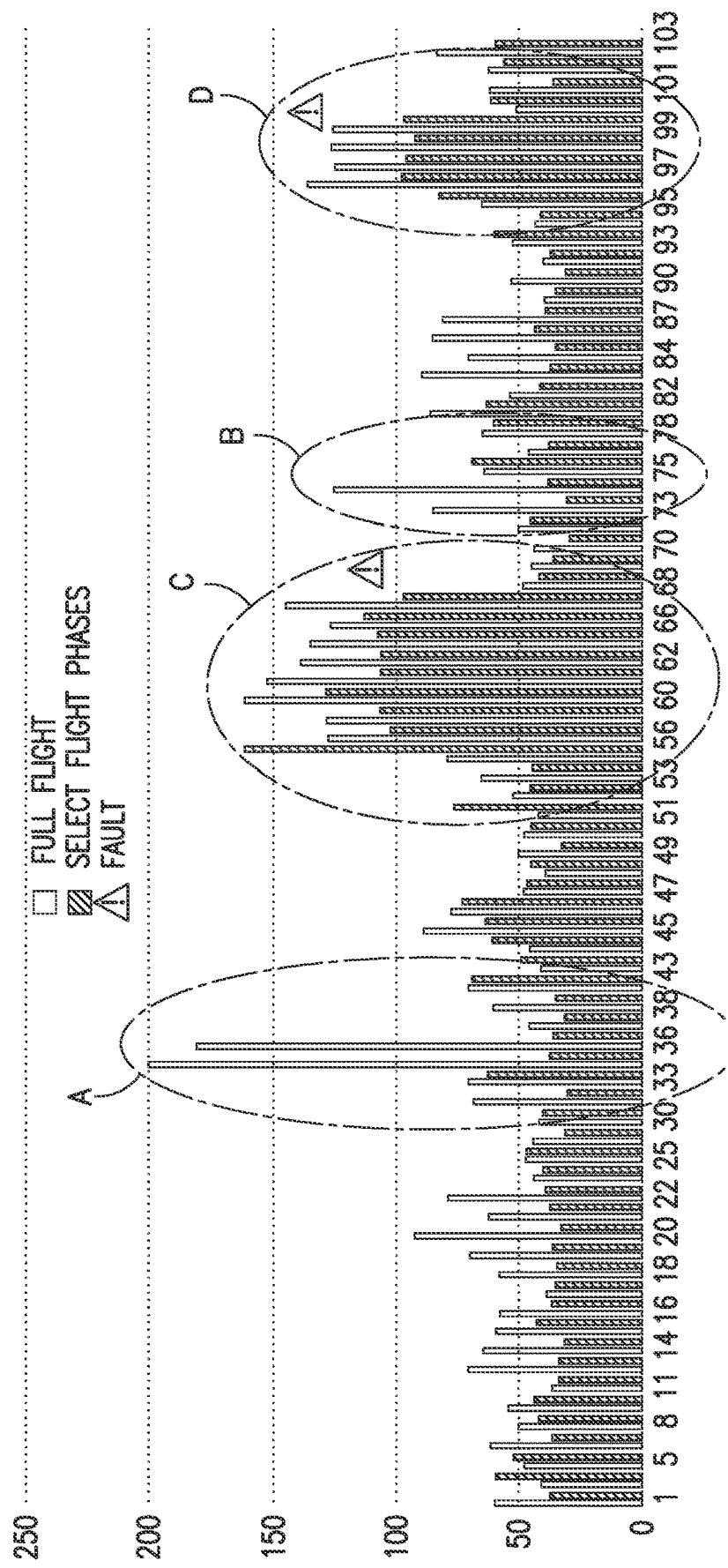
Figure 10:
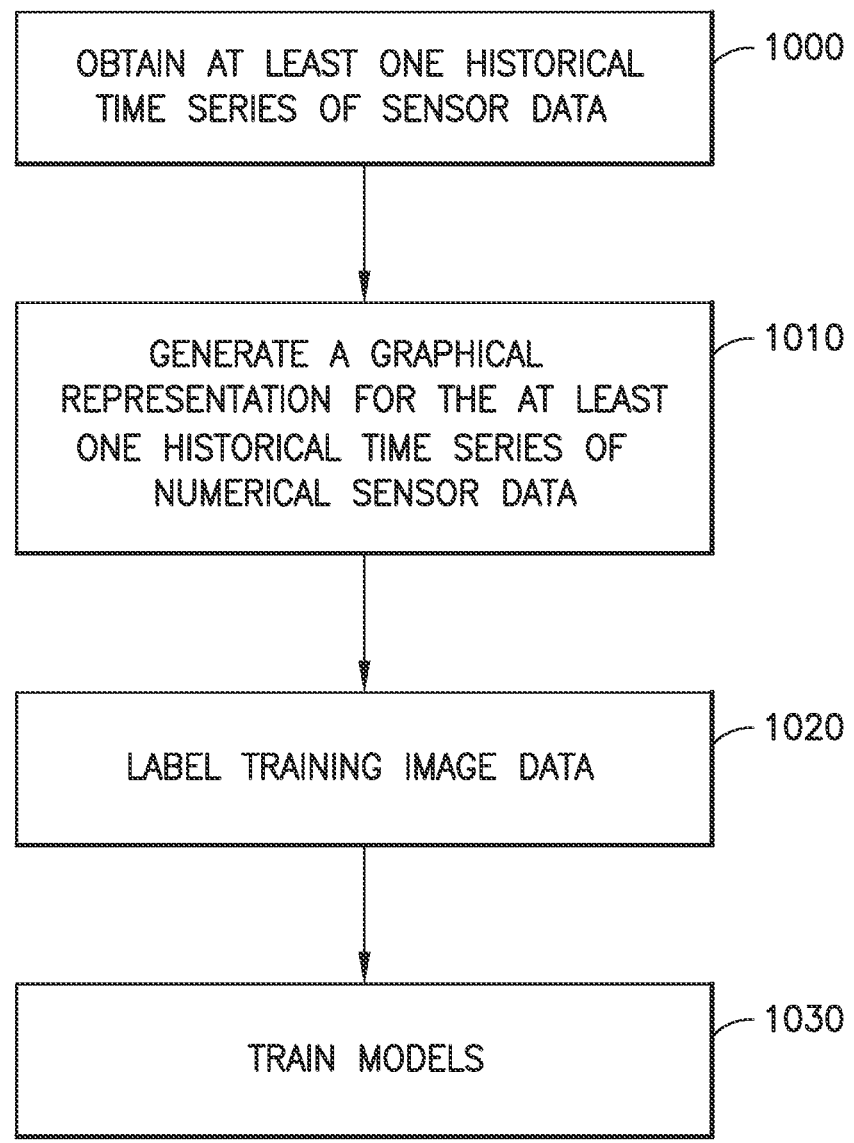
Figure 11:
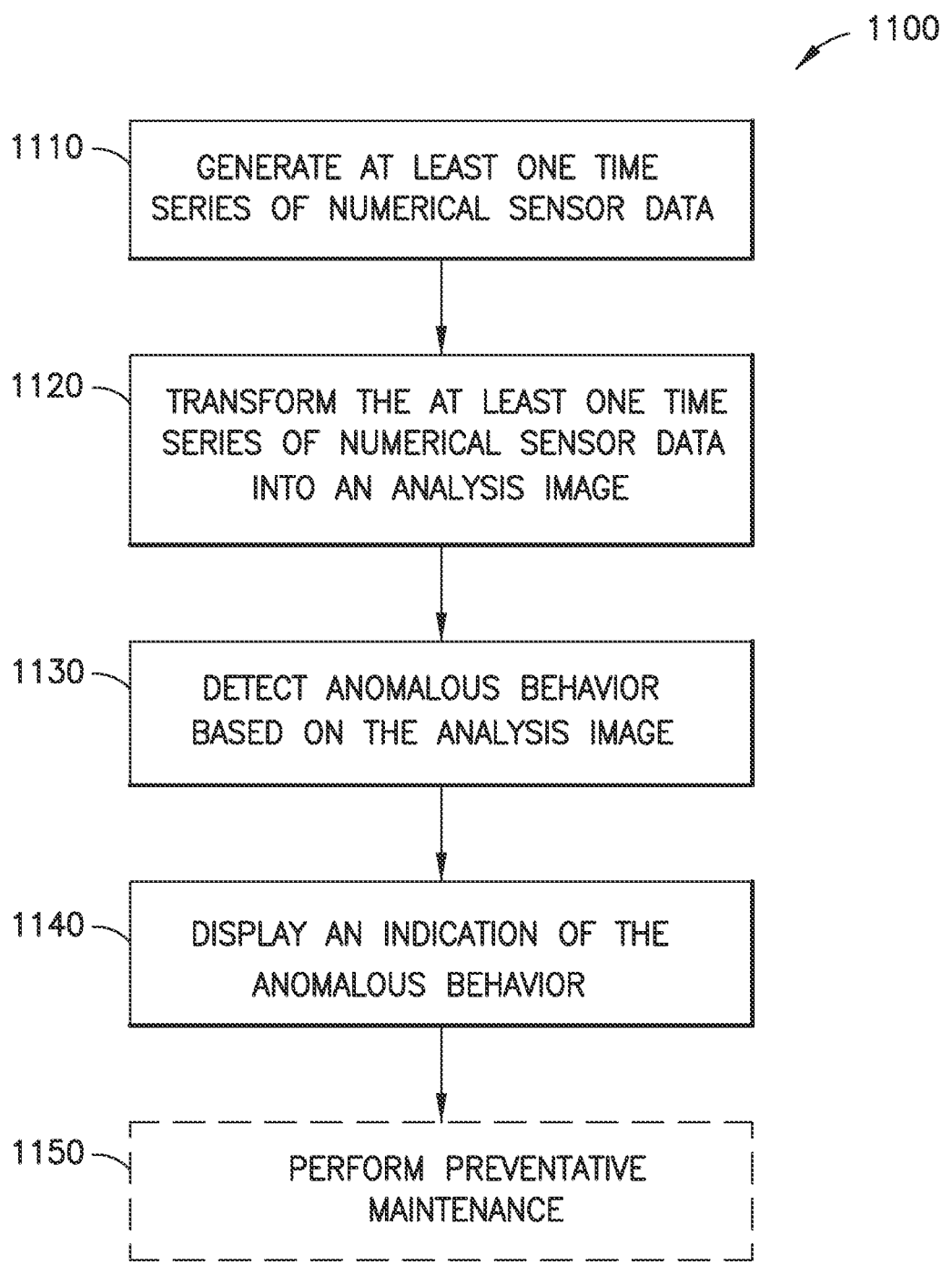
Figure 12:
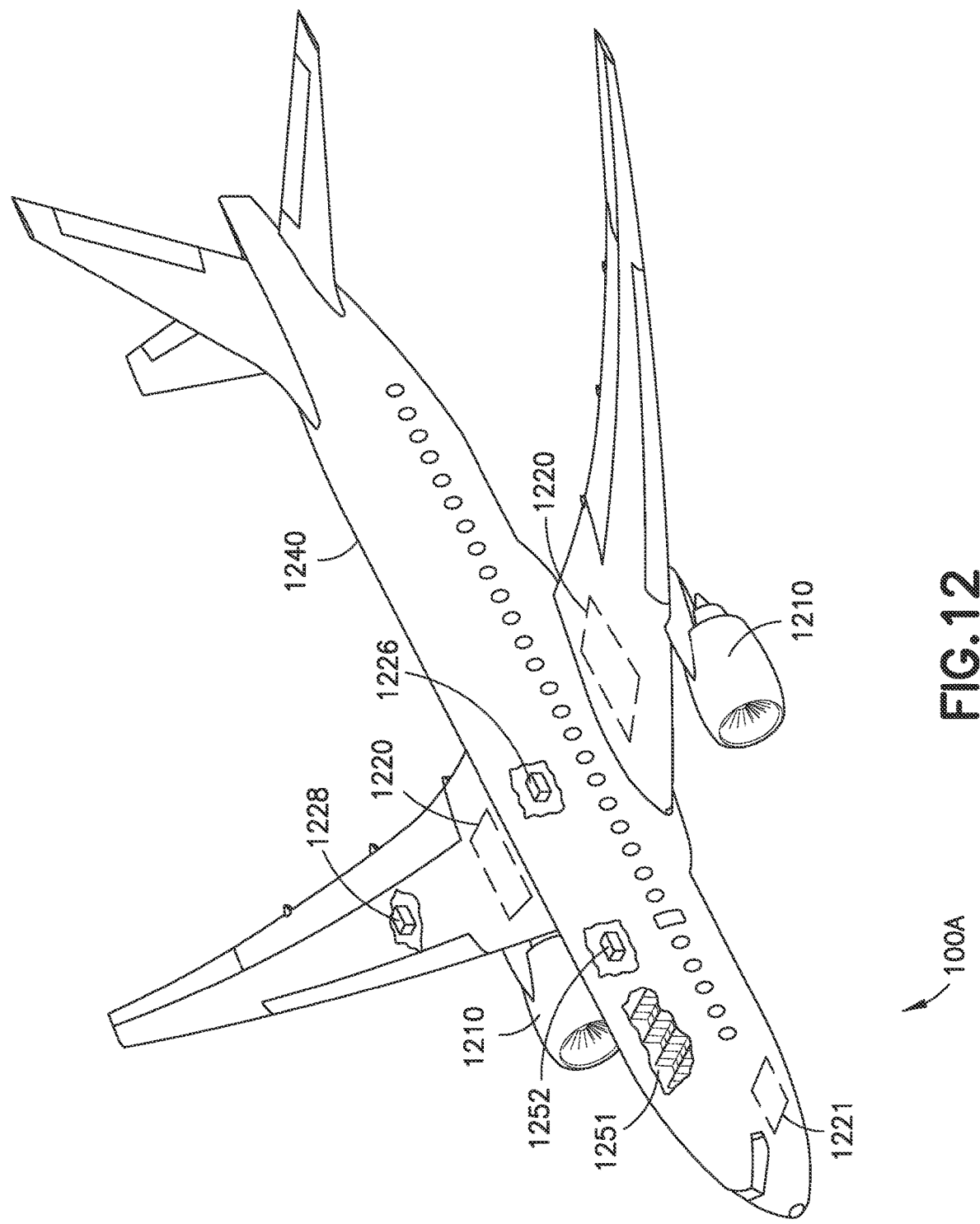
Figure 13:
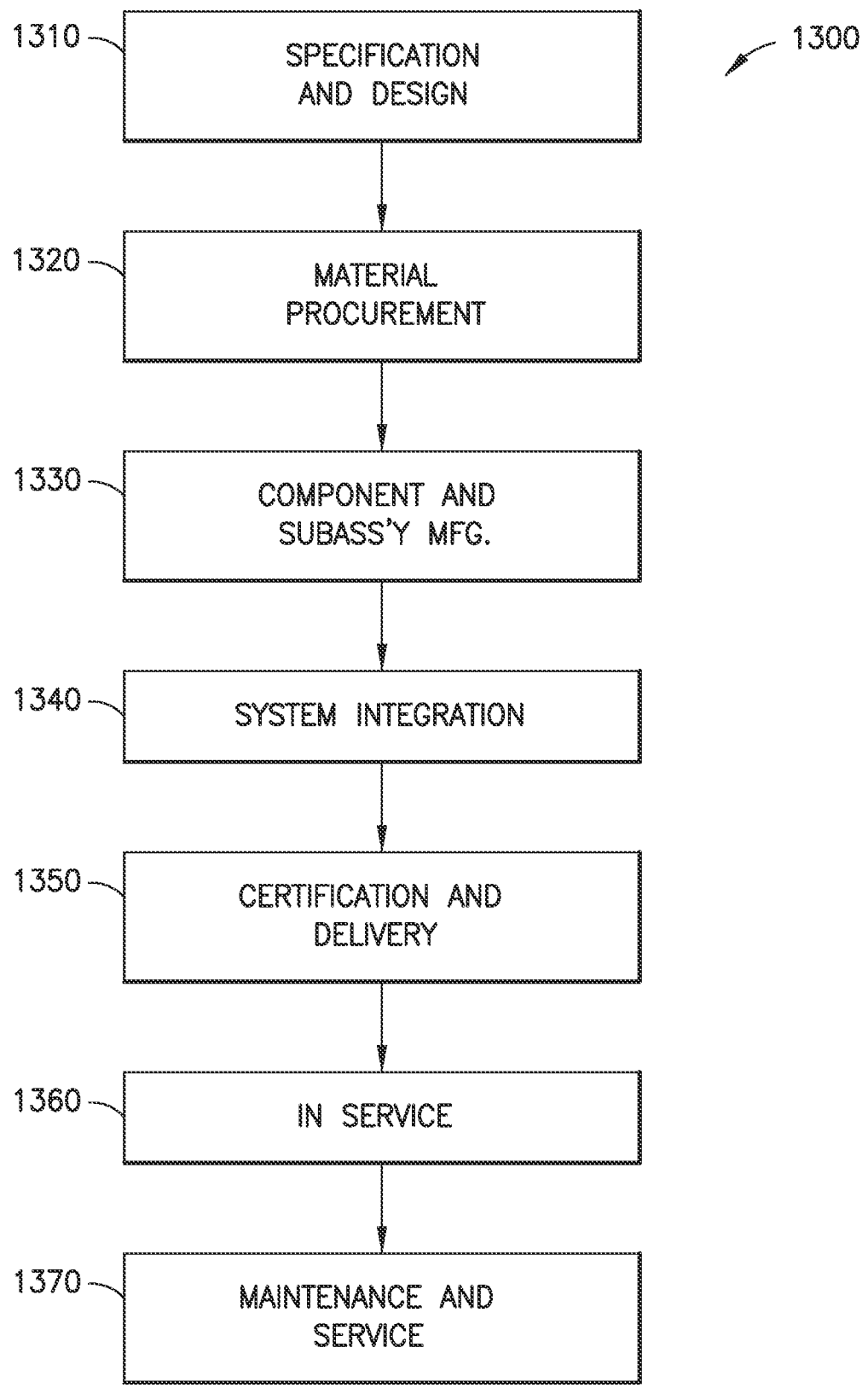

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic block diagram of a vehicle fault detection system in accordance with aspects of the present disclosure;

FIG. 2 is a schematic illustration of converting a time series of numerical sensor data to an image in accordance with aspects of the present disclosure;

FIGS. 3A-3D are illustrations of exemplary images generated from one or more time series of numerical sensor data, where each image includes different number system parameters in accordance with aspects of the present disclosure;

FIGS. 4A-4C are exemplary images of respective vehicle excursions in accordance with aspects of the present disclosure;

FIG. 5 is an exemplary illustration of the division of the image of FIG. 4A into one or more temporal sub-regions in accordance with aspects of the present disclosure;

FIGS. 6A-6C are exemplary images of events that may occur within the images of FIGS. 4A-C and 5 in accordance with aspects of the present disclosure;

FIG. 7A is a schematic illustration of a deep learning model in accordance with aspects of the present disclosure;

FIG. 7B is a schematic illustration of a deep learning model in accordance with aspects of the present disclosure;

FIG. 8 is an exemplary illustration of an output of the deep learning model of FIG. 7A in accordance with aspects of the present disclosure;

FIG. 9A is an exemplary illustration of an output of the deep learning model of FIG. 7B in accordance with aspects of the present disclosure;

FIG. 9B is an exemplary illustration of an output of the deep learning model of FIG. 7B in accordance with aspects of the present disclosure;

FIG. 9C is an exemplary illustration of a combined output of the deep learning model of FIG. 7B in accordance with aspects of the present disclosure;

FIG. 10 is an exemplary flow diagram for training a deep learning model in accordance with aspects of the present disclosure;

FIG. 11 is an exemplary flow diagram for determining faults in a vehicle system in accordance with aspects of the present disclosure;

FIG. 12 is an exemplary illustration of the vehicle in FIG. 1 in accordance with aspects of the present disclosure; and FIG. 13 is an exemplary flow diagram of an aircraft production and service methodology.

DETAILED DESCRIPTION

Referring to FIG. 1, the aspects of the present disclosure provide for a system 199 and method 1100 (see FIG. 11) for determining vehicle system 102 faults that avoids a difficult challenge of reducing at least one time series of numerical sensor data 112TA-112Tn from one or more vehicle 100 sensors 101 (e.g., a digital signature of a vehicle component) into a mathematical form for statistical or other analysis. The aspects of the present disclosure convert at least one time series of numerical sensor data 112TA-112Tn from a vehicle 100 (e.g., such as flight data from an aircraft) into at least one analysis image 180. The aspects of the present disclosure apply any suitable deep learning models 122M to the analysis images 180 to detect temporal anomalies in the at least one time series of numerical sensor data 112TA-112Tn and predict an occurrence of an impending vehicle 100 component 102C failure. For example, the at least one time series of numerical sensor data 112TA-112Tn from the vehicle 100 are converted to at least one (static) analysis image 180. Fault signatures that precede a vehicle 100 component 102C failure are identified from the graphical representation(s) (embodied in the analysis images 180) of at least one the time series of numerical sensor data 112TA-112Tn. The aspects of the present disclosure may provide for the capability to analyze all (or one or more) sensor readings in, for example, a vehicle 100 excursion 170, instead of conventional statistical summaries of the vehicle 100 excursions 170 (e.g., such as minimum, maximum, or average system parameter values).

The aspects of the present disclosure provide for the creation of vehicle prognosis that may not be possible with conventional statistical fault detection methods, and may increase the accuracy of existing predictive maintenance solutions (e.g., maintenance schedules, etc.). The aspects of the present disclosure may provide for entire vehicle 100 excursions 170 (or at least a portion thereof) to be analyzed so as to find anomalies in the at least one time series of numerical sensor data 112TA-112Tn that conventional (e.g., statistical) fault detection methods are unable to detect. The aspects of the present disclosure may provide for detection of anomalies that are rooted in complex system parameter 112A-112n relationships. The aspects of the present disclosure also may eliminate a need for manual feature generation such as is done with conventional statistical fault detection methods. The aspects of the present disclosure may also provide a picture of the behavior that is identified as being anomalous which may help maintenance personnel and/or vehicle operators understand and/or believe the fault predictions 189P made by the system 199 and method 1100 (see FIG. 11) described herein.

Illustrative, non-exhaustive examples, which may or may not be claimed, of the subject matter according to the present disclosure are provided below.

Still referring to FIG. 1 and also to FIG. 12, the vehicle fault detection system 199 will be described with respect to a fixed wing aircraft, such as aircraft 100A for exemplary purposes only. However, it should be understood that the vehicle fault detection system 199 may be deployed in any suitable vehicle 100, including but not limited to aerospace vehicles, rotary wing aircraft, fixed wing aircraft, lighter than air vehicles, maritime vehicles, and automotive vehicles. In one aspect, the vehicle 100 includes one or more vehicle systems 102 each having respective components 102C (e.g., engines and components thereof, air conditioning systems and components thereof, etc.). The vehicle systems 102 may include propulsion systems 1210, hydraulic systems 1228, electrical systems 1226, main landing gear systems 1220, and nose landing gear systems 1221. The vehicle 100 may also include an interior 1251 having an environmental system 1252. In other aspects, the vehicle systems 102 may also include one or more control systems coupled to an airframe 1240 of the aircraft 100A, such as for example, flaps, spoilers, ailerons, slats, rudders, elevators, and trim tabs.

Referring to FIG. 1, the vehicle fault detection system 199 includes at least one sensor 101 configured for coupling with a vehicle system 102. A vehicle control module 110 is coupled to the at least one sensor 101 in any suitable manner, such as through any suitable wired or wireless connection. The vehicle control module 110 may be any suitable controller onboard the vehicle 100 or any suitable controller that is wirelessly coupled to or hardwired to the vehicle 100 (e.g., such as a vehicle maintenance controller). The vehicle control module 110 may include any suitable memory 111 and processor 120 configured with any suitable data storage and non-transitory computer program code for carrying out the aspects of the present disclosure as described herein, where for example, the at least one sensor 101 is coupled to the memory 111 so that data from the at least one sensor 101 is stored in the memory 111 as described herein. The vehicle fault detection system 199 may also include any suitable user interface 125 coupled to the vehicle control module 110. The user interface 125 may be a display/interface of the vehicle 100 or a display/interface coupled to the vehicle 100 through a wired or wireless connection. The user interface is configured to present to an operator of the vehicle 100 an indication of anomalous behavior 189 for a component 102C (and/or for a respective system parameter 112A-112n of one or more components 102C) of the vehicle system 102.

The at least one sensor 101 is configured to generate at least one time series of numerical sensor data 112TA-112Tn for a respective system parameter 112A-112n of a vehicle system 102 (or component 102C thereof) being monitored. The vehicle control module 110 is configured to receive the at least one time series of numerical sensor data 112TA-112Tn from the at least one sensor 101, such as over the wired or wireless connection so that the at least one time series of numerical sensor data 112TA-112Tn is stored in the memory 111 in any suitable manner. For example, the memory 111 may be configured so that, when the at least one time series of numerical sensor data 112TA-112Tn is received, the at least one time series of numerical sensor data 112TA-112Tn is categorized within the memory. The at least one time series of numerical sensor data 112TA-112Tn may be categorized by one or more of an excursion 170, by a component 102CA-102Cn and a respective system parameter 112A-112n. Where the at least one time series of numerical sensor data 112TA-112Tn is categorized by the excursion 170, the at least one time series of numerical sensor data 112TA-112Tn is categorized according to the excursion 170 in which the at least one time series of numerical sensor data 112TA-112Tn was obtained. Where the at least one time series of numerical sensor data 112TA-112Tn is categorized by a component 102CA-102Cn, at least one time series of numerical sensor data 112TA-112Tn is categorized by the component 102CA-102Cn from which the at least one time series of numerical sensor data 112TA-112Tn was obtained. Where the at least one time series of numerical sensor data 112TA-112Tn is categorized by the respective system parameter 112A-112n, the at least one time series of numerical sensor data 112TA-112Tn is categorized by the respective system parameter 112A-112n to which the at least one time series of numerical sensor data 112TA-112Tn corresponds (e.g., at least one of (or each of) the at least one time series of numerical sensor data 112TA-112Tn corresponds to a respective system parameter 112A-112n of the vehicle system 102 being monitored).

Referring to FIGS. 1 and 2, the vehicle control module 110 is configured to generate a graphical representation for the at least one time series of numerical sensor data 112TA-112Tn to form at least one analysis image 180 of at least one system parameter 112A-112n. For example, the processor 120 of the vehicle control module 110 includes an image generation module 121 that transforms, as illustrated in FIG. 2, the at least one time series of numerical sensor data 112TA-112TD for the respective system parameter 112A-112D into an analysis image 180A-180D, 180CI of at least one system parameter 112A-112D. The vehicle control module 110 (such as the image generation module 121 of the processor 120) is configured to access the at least one time series of numerical sensor data 112TA-112Tn from the memory 111, where at least one of (or each of) the at least one time series of numerical sensor data 112TA-112Tn corresponds to a respective system parameter 112A-112n of a vehicle system 102 being monitored. In one aspect, the image generation module 121 is configured to generate an analysis image 180A-180D for each respective system parameter 112A-112D where the image analysis described herein is performed in the individual analysis images 180A-180D. In another aspect, the image generation module 121 is configured to combine the individual analysis images 180A-180D into a combined analysis image 180CI so that relationships between the system parameters 112A-112D (e.g., effects on one system parameter resulting from a state change of a different system parameter) are graphically represented or are otherwise revealed to, for example, an operator of the vehicle 100. As described herein, the vehicle control module 110 is configured to identify relationships between more than one system parameter 112A-112n based on the at least one analysis image 180 of at least one system parameter 112A-112n. For example, referring also to FIGS. 3A-3D, the combined analysis image 180CI may be a combination of any number of individual analysis images. For exemplary purposes only, the combined analysis image 180CI2 illustrated in FIG. 3A is a combination of two individual analysis images; the combined analysis image 180CI4 illustrated in FIG. 3B is a combination of four individual analysis images; the combined analysis image 180CI7 illustrated in FIG. 3C is a combination of seven individual analysis images; and, the combined analysis image 180CI10 illustrated in FIG. 3D is a combination of ten individual analysis images. While combined analysis images 180CI are illustrated as including graphical representations of two, four, seven and ten system parameters, in other aspects, any suitable number of individual analysis images 180 may be combined into a single combined analysis image 180CI. As such, the at least one analysis image 180 (such as the combined analysis image 180CI) of the at least one system parameter 112A-112n is common to more than one time series of numerical sensor data 112TA-112Tn. The relationships between the system parameters 112A-112n may be identified by monitoring patterns between the system parameters 112A-112n in the at least one analysis image 180. To identify the relationships between the system parameters 112A-112n, the individual analysis images 180A-180D are generated by the image generation module 121 with a fixed value for the Y axis of the individual images 180A-180D so that the analysis image(s) (and the training image(s) 160 described herein) have the same Y axis scale, where the Y axis represents a sensor 101 value and the X axis represents time.

Still referring to FIGS. 1 and 2 and also to FIGS. 4A-6C, the at least one analysis image 180 may be generated depending on which portion(s) of the excursion 170 are to be analyzed. For example, at least one of (or each of) the at least one time series of numerical sensor data 112TA-112Tn corresponds to a whole vehicle excursion 170 where the graphical representation corresponds to the at least one time series of numerical sensor data 112TA-112Tn for the whole vehicle excursion 170. In the case of an aircraft, the excursion 170 is a flight of the aircraft from a departure gate to an arrival gate. In one aspect, an analysis image 180CIE1-180CIE3 may be generated for the entire excursion 170A-170C as illustrated in FIGS. 4A-4C, where the respective analysis images 180CIE1-180CIE3 presented in FIGS. 4A-4C each represent more than one system parameter 112A-112D for a single excursion 170A-170C of the vehicle 100. Here, the analysis images 180CIE1-180CIE3 (and the training images 160 as described herein) represent entire flights that may be analyzed as a whole for faults.

In one aspect, the analysis image 180CIE1-180CIE3 for one or more of the excursions 170A-170C may be temporally sub-divided into one or more portions. For example, the analysis image 180CIE1 for excursion 170A in FIG. 4A may be temporally sub-divided into three increments 500A, 500B, 500C (e.g., hourly increments, flight stages, or any other predetermined temporal division). Here, temporally sub-dividing the analysis image 180CIE1-180CIE3 provides for the analysis of specified portions of the respective excursion 170A-170C, which may provide greater fault detection detail than an analysis of an overall flight, so as to substantially eliminate false positives in the anomaly detection. For example, false positive anomaly detection may occur where a analysis images for short duration flight are compared to analysis images for a long duration flight (or vice versa) where sub-dividing the analysis images (and the training images 160 as described herein) provides for a more granular image analysis to reduce the number of false positive anomaly detection.

In another aspect, as can be seen in FIGS. 6A-6C the at least one analysis image 180CIP1-180CIP3 (and the training images 160 as described herein) may be generated to capture any suitable predetermined time periods 610A, 610B before and/or after a predetermined event 600. In one aspect, the predetermined time periods 610A, 610B may about two minutes before and/or after the event 600, while in other aspects the predetermined time periods may be more or less than about two minutes. In still other aspects, the predetermined time period 610A prior to the event 600 may be different than the predetermined time period following the event 600. For example, system parameter 112A may be the state (e.g., open or closed) of a valve and the event 600 may be the opening and closing of the valve within the environmental system 1252. The system parameter 112B may be a temperature of the environmental system 1252. Here it can be seen that the analysis images 180CIP1, 180CIP2 are substantially similar while system parameter 112B in analysis image 180CIP3 differs, which may be indicative of a fault in system parameter 112B. As described above, the analysis images 180CIP1, 180CIP2 may be indicative of a relationship between system parameters 112A, 112B where system parameter 112B graphically responds to the state change of system parameter 112A as illustrated in FIGS. 6A and 6B. The different shape of the curve for system parameter 112B in FIG. 6C may be a departure from the relationship between system parameters 112A, 112B as illustrated in FIGS. 6A and 6B and may be indicative of a fault in the component 102C (see FIG. 1) that corresponds with system parameter 112B.

Referring still to FIG. 1, the vehicle control module 110 is configured to detect anomalous behavior of a component 102C of the vehicle system 102 based on the at least one analysis image 180 of at least one system parameter 112A-112n. For example, the processor 120 of the vehicle control module 110 includes a deep learning module 122 configured to detect anomalous behavior of the respective system parameter 112A-112n, with at least one deep learning model 122M, based on the at least one analysis image 180 of the at least one system parameter 112A-112n. Referring also to FIGS. 7A and 7B in one aspect, the at least one deep learning model 122M includes more than one deep learning model 122MA, 122MB configured to detect the anomalous behavior for the component 102C of the vehicle system 102. Here two deep learning models 122MA, 122MB are illustrated but in other aspects the deep learning module 122 may include any number of deep learning models 122MA-122Mn. As an example, the deep learning module 122 may include a convolutional neural network deep learning model 122MA and/or a stacked auto-encoder deep learning model 122MB or any other suitable deep learning models. Where the deep learning module 122 includes more than one deep learning model 122MA-122Mn (whether the same type of deep learning model such as, e.g., more than one convolutional neural network or more than one stacked auto-encoder; or different types of deep learning models such as, e.g., a combination of convolutional neural networks and stacked-auto encoders) the deep learning module 122 may be configured to select the deep learning models 122M for analysis of the at least one analysis image 180 depending on a respective predetermined vehicle operating condition 190.

In one aspect, the respective predetermined vehicle operating condition 190 comprises one or more of an excursion (e.g., in the case of an aircraft, a flight) duration 190A and weather conditions 190B.

Referring to FIGS. 1 and 10, prior to analyzing the at least one analysis image 180 the at least one deep learning model 122M is trained by the vehicle control module 110 (such as by the processor 120). For example, the vehicle control module 110 is configured to receive or otherwise obtain at least one historical time series of numerical sensor data 150 (FIG. 10, Block 1000) from at least one historical vehicle excursion 170H, where the at least one historical time series of numerical sensor data 150 corresponds to the respective system parameter 112A-112n of the vehicle system 102 being monitored. The at least one historical vehicle excursion 170H may be one or more historical excursions 170H for the same vehicle or a number of different vehicles having similar characteristics, e.g., a number of different aircraft having the same make and model. The at least one historical time series of numerical sensor data 150 from the at least one historical vehicle excursion 170H may be stored in the memory 111 or any other suitable location accessible by the vehicle control module 110.

The image generation module 121 is configured to generate a graphical representation for the at least one historical time series of numerical sensor data 150 (FIG. 10, Block 1010) for a respective historical vehicle excursion 170H to form at least one training image 160 of the at least one system parameter 112A-112n being monitored. The at least one training image 160 is generated by the image generation module 121 in the same manner, as described above with respect to FIGS. 2, 3A-3D, 4A-4C, 5, and 6A-6C, that the at least one analysis image 180 is generated, again noting that the Y axis (e.g., the sensor value) of the at least one training image 160 has the same scale as Y axis (e.g., the sensor value) of the at least one analysis image 180. As such, in the manner described above, the at least one training image 160 of the at least one system parameter 112A, 112n is (where the individual training images are combined into a combined training image) common to more than one historical time series of numerical sensor data 150 from the at least one historical vehicle excursion 170H.

The historical nature of the at least one historical excursion 170H and the respective at least one historical time series of numerical sensor data 150 provides information as to whether the at least one historical time series of numerical sensor data 150 and/or the respective historical excursion 170H was/were anomalous or ordinary. The term "anomalous" as used herein means that the sensor data and/or excursion exhibited a deviation from normal operating behavior, which is, if persistent, indicative of degraded vehicle system 102 component 102C performance and a precursor to fault/failure of the component 102C of the vehicle system 102 being monitored. The term "ordinary" as used herein means that the sensor data and/or excursion exhibited normal operating characteristics (e.g., no fault/failure) of the component 102C of the vehicle system 102 being monitored. Using knowledge of whether the at least one historical time series of numerical sensor data 150 was anomalous or ordinary, the vehicle control module 110 is configured to label the at least one training image 160 (FIG. 10, Block 1020) of the at least one system parameter 112A, 112n for the respective historical vehicle excursion as being one of anomalous 161 (e.g., an anomalous training image) or ordinary 162 (e.g., an ordinary training image).

Referring to FIGS. 1, 7A, 7B, and 10, the vehicle control module 110 trains the at least one deep learning model 122M (FIG. 10, Block 1030). For example, to train the convolutional neural network deep learning model 122MA, the vehicle control module 110 applies the labeled at least one training image 160 to the convolutional neural network deep learning model 122MA. The convolutional neural network deep learning model 122MA scans through each of the labeled at least one training image 160 and identifies groups of pixels that are similar. Based on the similar groups of pixels the convolutional neural network deep learning model 122MA learns to identify the anomalous 161 training images and the ordinary 162 training images. As another example, to train the stacked auto-encoder deep learning model 122MB the vehicle control module 110 employs the stacked auto-encoder deep learning model 122MB to deconstruct and reconstruct the at least one training image 160. Once the model is trained, an analysis image 180 can be deconstructed and then reconstructed by the model. An amount of error between an original analysis image 180 and a respective reconstructed analysis image identifies whether the at least one analysis image 180 is anomalous or ordinary. For example, if the at least one analysis image 180 represents an ordinary flight (as opposed to anomalous) then the lower the error between the reconstructed analysis image and the respective original analysis image 180, the greater the likelihood that the respective original analysis image 180 is ordinary. On the other hand, if the at least one analysis image 180 represents an anomalous flight (as opposed to ordinary) the greater the error between the reconstructed analysis image and the respective original analysis image 180, the greater the likelihood that the respective original analysis image 180 is anomalous. An error threshold may be established for the at least one analysis image 180 so that, when the error in a reconstructed analysis image exceeds the threshold, the respective analysis image 180 is flagged or otherwise identified as indicating an impending fault in the vehicle system 102 component 102C.

Referring to FIGS. 1 and 11, the vehicle control module 110 is configured to predict a failure of the component 102C of the vehicle system 102 based on the anomalous behavior of the component 102C of the vehicle system 102. For example, during each vehicle excursion 170, the at least one sensor 101 for the component 102C of the vehicle system 102 being monitored generates the at least one time series of numerical sensor data 112TA-112Tn (FIG. 11, Block 1110). Prior to, after, and/or during a vehicle excursion 170, the at least one time series of numerical sensor data 112TA-112Tn received from the at least one sensor 101 for the component 102C of the vehicle system 102 may be used by the image generation module 121 where the at least one time series of numerical sensor data 112TA-112Tn is transformed into the at least one analysis image 180 in the manner described above (FIG. 11, Block 1120). The vehicle control module 110 employs the at least one deep learning model 122M of the deep learning module 122 to detect anomalous behavior of the respective system parameter 112A-112n based on the at least one analysis image 180 of at least one system parameter 112A-112n (FIG. 11. Block 1130). For example, the convolutional neural network deep learning model 122MA (see FIG. 7A) compares the at least one analysis image 180 with the knowledge learned from the anomalous 161 and ordinary 162 at least one training image 160 to determine if the at least one analysis image 180 is indicative of an impending fault/failure in the component 102C of the vehicle system 102 being monitored. As another example, the stacked auto-encoder deep learning model 122MB (see FIG. 7B) deconstructs the at least one analysis image 180 and then reconstructs the deconstructed at least one analysis image 180 to determine a reconstructed input error between the original and reconstructed version of the at least one analysis image 180. If the reconstructed input error is over, for example, a predetermined threshold (e.g., about 50% error or more or less than about 50% error) then the at least one analysis image 180 is determined by the vehicle control module 110 to be indicative of an impending fault/failure in the component 102C of the vehicle system 102 being monitored.

Referring to FIGS. 1, 7A and 8, an exemplary output of the convolutional neural network deep learning model 122MA of FIG. 7A (e.g., generated from the at least one time series of numerical sensor data 112TA-112Tn of at least one system parameter 112A-112n for the component 102C) is illustrated for the component 102C of the vehicle system 102 over a number of different excursions 170, where each vertical bar represents a whole excursion 170. Here positive values along the Y axis are classified by the convolutional neural network deep learning model 122MA as being ordinary while the negative values along the Y axis are classified by the convolutional neural network deep learning model 122MA as being anomalous/faulty. As described above, the convolutional neural network deep learning model 122MA categorizes each excursion 170 as being ordinary or anomalous so that a historical graph, such as the one illustrated in FIG. 8, may be presented to an operator through the user interface 125. Considering excursions from about excursion number 1 to about excursion number 10, the output of the convolutional neural network deep learning model 122MA indicates that the analysis image 180 began to deviate from being an ordinary analysis image 180NRM at about excursion 5 and exhibited characteristics of an anomalous analysis image 180ABN (noting the difference between system parameter 112B in the ordinary analysis image 180NRM and the anomalous analysis image 180ABN). Based on the repeated negative values of the analysis image 180 from about excursion 6 to about excursion 9, the vehicle control module 110 may predict a fault/failure in the component 102C which is shown in FIG. 8 as occurring at about excursion 10. The vehicle control module 110 may be configured to cause the user interface 125 to present/display the output of the convolutional neural network deep learning model 122MA on the user interface 125 as an indication of anomalous behavior 189 in the component 102C for the prediction 189P of the fault/failure to the operator (FIG. 11, Block 1140), where when degraded performance of the component 102C is illustrated in the deep learning model output the operator may perform preventative maintenance on the component 102C (FIG. 11, Block 1150) prior to a component 102C fault/failure occurring.

Referring to FIGS. 1, 7B, and 9A-9C, an exemplary output of the stacked auto-encoder deep learning model 122MB of FIG. 7B (e.g., generated from the at least one time series of numerical sensor data 112TA-112Tn of at least one system parameter 112A-112n for the component 102C) is illustrated for the component 102C of the vehicle system 102 over a number of different excursions 170. In FIG. 9A each vertical bar represents a whole excursion. In FIG. 9B each vertical bar represents a selected portion of the excursion (e.g., a selected flight phase such as power on through climb). FIG. 9C illustrates a combination of FIGS. 9A and 9B where the resulting graph may eliminate false positives caused by short flights.

As can be seen in FIG. 9A a larger reconstructed input error for a flight may be indicative of an impending failure in the corresponding component 102C. Here, for exemplary purposes only reconstructed input error values of over about 100 (in other aspects any suitable reconstructed input error value may be used) may be indicative of an impending failure such that sustained numbers of excursions 170 exceeding the reconstructed input error value of about 100 (see e.g., the excursions from about excursion number 56 to about excursion number 67 and the excursions from about excursion number 96 to about excursion number 99) is predictive of the fault/failure of the component 102C (see the failure of the component at about excursion numbers 67 and 99). However, there may be instances where an excursion may be indicative of a fault due to characteristics of the excursion itself (e.g., a duration of the excursion or a duration of a portion of the excursion). For example, the excursion indicated at about excursion number 35 in FIG. 9A is shown as a spike (e.g., a large increase) in the reconstructed input error (e.g., having a reconstructed input error of about 200) however, further analysis of the excursion (as described below with respect to FIG. 9B) indicates that the spike in the reconstructed input error shown in the graph was due to the excursion having a short duration compared to the other excursions shown in the graph (e.g., noting that a number of excursions prior to and following the spike are below the reconstructed input error value of about 100; see also the excursion shown at about excursion number 74 which exhibits a reconstructed input error value over about 100 due to a longer tail flight phase).

To determine whether spikes in the reconstructed input error for a whole excursion are false positives, the excursions may be subdivided into flight phases in the manner described with respect to, e.g., FIG. 5. FIG. 9B is a graphical illustration of the reconstructed input error for the select excursion (in this case a flight) phase of the vehicle 100 from power on through climb. Based on an image analysis of selected flight phase, it can be seen in FIG. 9B that the excursions corresponding to the vertical bars at about excursion numbers 35 and 74 in FIG. 9A are ordinary excursions. It can also be seen in FIG. 9B that the excursions corresponding to the vertical bars at about excursion numbers 67 and 99 in FIG. 9A are confirmed to be anomalous excursions indicative of a component 102C fault/failure.

As noted above, the graphs illustrated in FIGS. 9A and 9B can be combined into a single graph illustrated in FIG. 9C, which may eliminate false positive failure indications. For example, referring to graph regions A and B in FIG. 9C, it can be seen that the full flight image analysis is accompanied by a flight phase analysis that indicates a large discrepancy between the respective reconstructed input error for the respective excursion numbers. The large discrepancy between the full flight image analysis and the flight phase image analysis for the same excursion number is indicative of a false positive indication of fault/failure. On the other hand, referring to graph regions C and D in FIG. 9C, where the reconstructed input error for both the full flight image analysis and the flight phase image analysis substantially coincide (e.g., the values are both above for example, about 100, which may be a threshold value for indicating fault/failure) the graph indicates/predicts a fault/failure of the component 102C.

In a manner similar to that described above with respect to the convolutional neural network deep learning model 122MA (see FIG. 7A), the vehicle control module 110 may be configured to cause the user interface 125 to present/display the output (e.g., one or more of the graphs illustrated in FIGS. 9A-9C) of the stacked auto-encoder deep learning model 122MB (FIG. 7B) on the user interface 125 as an indication of anomalous behavior 189 in the component 102C for the prediction 189P of the failure to the operator (FIG. 11, Block 1140), where when degraded performance of the component 102C is illustrated in the deep learning model output the operator may perform preventative maintenance on the component 102C (FIG. 11, Block 1150) prior to a component 102C fault/failure occurring.

Referring to FIG. 1, the vehicle control module 110 may perform the above-described fault detection and failure prediction analysis at vehicle 100 startup and/or prior to any suitable specified operation of the vehicle 100 (e.g., for example, dropping an anchor, docking with a space station, operating a robotic arm of the vehicle, etc.). In other aspects, the vehicle control module 110 may perform the above-described fault detection and fault prediction analysis at vehicle 100 shutdown. For example, the vehicle fault detection system 199 may include a vehicle interlock 197 coupled with the vehicle control module 110 and one or more of the vehicle systems 102. The vehicle interlock 197 is configured to prevent an operation (corresponding to a vehicle system 102 coupled to the interlock 197) of the vehicle 100 based on a detection of the anomalous behavior that is indicative of a component 102C fault/failure. Here, if the vehicle control module 110 detects anomalous behavior of a vehicle system 102 component 102C the interlock 197 may prevent the operation of the vehicle system component 102C. For example, if anomalous behavior is detected for a robotic arm of a spacecraft (that includes the fault detection system 199 described herein) the vehicle interlock 197 may prevent the operation of the robotic arm to allow for the performance of preventative maintenance. In other aspects, the vehicle interlock 197 may be configured to provide limited/restricted use of the vehicle component 102C when anomalous behavior of the vehicle system 102 component 102C is detected by the vehicle fault detection system 199.

Referring to FIGS. 12 and 13, examples of the present disclosure may be described in the context of aircraft manufacturing and service method 1300 as shown in FIG. 13. In other aspects, the examples of the present disclosure may be applied in any suitable industry, such as e.g., automotive, maritime, aerospace, etc. as noted above. With respect to aircraft manufacturing, during pre-production, illustrative method 1300 may include specification and design (block 1310) of aircraft 100A and material procurement (block 1320). During production, component and subassembly manufacturing (block 1330) and system integration (block 1340) of aircraft 100A may take place. Thereafter, aircraft 100A may go through certification and delivery (block 1350) to be placed in service (block 1360). While in service, aircraft 100A may be scheduled for routine maintenance and service (block 1370). Routine maintenance and service may include modification, reconfiguration, refurbishment, etc. of one or more systems of aircraft 100A which may include and/or be facilitated by the fault determination described herein.

Each of the processes of illustrative method 1300 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

The apparatus(es), system(s), and method(s) shown or described herein may be employed during any one or more of the stages of the manufacturing and service method 1300. For example, components or subassemblies corresponding to component and subassembly manufacturing (block 1330)

may be fabricated or manufactured in a manner similar to components or subassemblies produced while aircraft 100A is in service (block 1360). Similarly, one or more examples of the apparatus or method realizations, or a combination thereof, may be utilized, for example and without limitation, while aircraft 100A is in service (block 1360) and/or during maintenance and service (block 1370).

The following are provided in accordance with the aspects of the present disclosure:

A1. A vehicle fault detection system comprising:
at least one sensor configured for coupling with a vehicle system;
a vehicle control module coupled to the at least one sensor, the vehicle control module being configured to
receive at least one time series of numerical sensor data from the at least one sensor, at least one of (or each of) the at least one time series of numerical sensor data corresponds to a respective system parameter of the vehicle system being monitored,
generate a graphical representation for the at least one time series of numerical sensor data to form an analysis image of at least one system parameter, and
detect anomalous behavior of a component of the vehicle system based on the analysis image of at least one system parameter; and
a user interface coupled to the vehicle control module, the user interface being configured to present to an operator an indication of the anomalous behavior for the component of the vehicle system.

A2. The vehicle fault detection system of paragraph A1, wherein the vehicle is one of an automotive vehicle, a maritime vehicle, and an aerospace vehicle.

A3. The vehicle fault detection system of paragraph A1, wherein the vehicle is an aircraft.

A4. The vehicle fault detection system of paragraph A1, wherein the analysis image of at least one system parameter is common to more than one time series of numerical sensor data.

A5. The vehicle fault detection system of paragraph A1, wherein the vehicle control module includes a deep learning module including at least one deep learning model configured to detect the anomalous behavior for the component of the vehicle system.

A6. The vehicle fault detection system of paragraph A5, wherein the at least one deep learning model includes more than one deep learning model configured to detect the anomalous behavior for the component of the vehicle system depending on a respective predetermined vehicle operating condition.

A7. The vehicle fault detection system of paragraph A6, wherein the respective predetermined vehicle operating condition comprises one or more of a flight duration and weather conditions.

A8. The vehicle fault detection system of paragraph A5, wherein the vehicle control module is configured to train the at least one deep learning model by:
receiving at least one historical time series of numerical sensor data from at least one historical vehicle excursion, the at least one historical time series of numerical sensor data corresponds to the respective system parameter of the vehicle system being monitored,
generating a graphical representation for the at least one historical time series of numerical sensor data for a respective historical vehicle excursion to form a training image of at least one system parameter, and
labeling the training image of at least one system parameter for the respective historical vehicle excursion as being one of anomalous or ordinary.

A9. The vehicle fault detection system of paragraph A8, wherein the training image of at least one system parameter is common to more than one historical time series of numerical sensor data from the at least one historical vehicle excursion.

A10. The vehicle fault detection system of paragraph A8, wherein at least one of (or each of) the at least one historical vehicle excursion is a flight of the vehicle.

A11. The vehicle fault detection system of paragraph A5, wherein the at least one deep learning model comprises a convolutional neural network.

A12. The vehicle fault detection system of paragraph A5, wherein the at least one deep learning model comprises a stacked auto-encoder.

A13. The vehicle fault detection system of paragraph A1, wherein at least one of (or each of) the at least one time series of numerical sensor data corresponds to a whole vehicle excursion where the graphical representation corresponds to the at least one time series of numerical sensor data for the whole vehicle excursion.

A14. The vehicle fault detection system of paragraph A1, wherein the vehicle control module is configured to identify relationships between more than one system parameter based on the analysis image of at least one system parameter.

A15. The vehicle fault detection system of paragraph A1, further comprising a vehicle interlock coupled with the vehicle control module, the vehicle interlock being configured to prevent an operation of the vehicle based on a detection of the anomalous behavior.

A16. The vehicle fault detection system of paragraph A1, wherein the vehicle control module is further configured to predict a failure of the component of the vehicle system based on the anomalous behavior of the component of the vehicle system and the user interface is further configured to present prediction of the failure to the operator.

B1. A vehicle fault detection system comprising:
a memory;
at least one sensor coupled to the memory, the at least one sensor being configured to generate at least one time series of numerical sensor data for a respective system parameter of a vehicle system being monitored;
a vehicle control module coupled to the memory, the vehicle control module being configured to transform the at least one time series of numerical sensor data for the respective system parameter into an analysis image of at least one system parameter and detect, with at least one deep learning model, anomalous behavior of the respective system parameter based on the analysis image of at least one system parameter; and
a user interface coupled to the vehicle control module, the user interface being configured to present to an operator an indication of the anomalous behavior of the respective system parameter.

B2. The vehicle fault detection system of paragraph B1, wherein the vehicle control module is configured to access the at least one time series of numerical sensor data from the memory, at least one of (or each of) the at least one time series of numerical sensor data corresponds to a respective system parameter of a vehicle system being monitored.

B3. The vehicle fault detection system of paragraph B1, wherein the vehicle is one of an automotive vehicle, a maritime vehicle, and an aerospace vehicle.

B4. The vehicle fault detection system of paragraph B1, wherein the vehicle is an aircraft.

B5. The vehicle fault detection system of paragraph B1, wherein the analysis image of at least one system parameter is common to more than one time series of numerical sensor data.

B6. The vehicle fault detection system of paragraph B1, wherein the vehicle control module includes a deep learning module including the least one deep learning model.

B7. The vehicle fault detection system of paragraph B1, wherein the at least one deep learning model includes more than one deep learning model configured to detect the anomalous behavior for a component of the vehicle system depending on a respective predetermined vehicle operating condition.

B8. The vehicle fault detection system of paragraph B7, wherein the respective predetermined vehicle operating condition comprises one or more of a flight duration and weather conditions.

B9. The vehicle fault detection system of paragraph B1, wherein the vehicle control module is configured to train the at least one deep learning model by:

receiving at least one historical time series of numerical sensor data from at least one historical vehicle excursion, the at least one historical time series of numerical sensor data corresponds to the respective system parameter of the vehicle system being monitored, generating a graphical representation for the at least one historical time series of numerical sensor data for a respective historical vehicle excursion to form a training image of at least one system parameter, and labeling the training image of at least one system parameter for the respective historical vehicle excursion as being one of anomalous or ordinary.

B10. The vehicle fault detection system of paragraph B9, wherein the training image of at least one system parameter is common to more than one historical time series of numerical sensor data from the at least one historical vehicle excursion.

B11. The vehicle fault detection system of paragraph B9, wherein at least one of (or each of) the at least one historical vehicle excursion is a flight of the vehicle.

B12. The vehicle fault detection system of paragraph B1, wherein the at least one deep learning model comprises a convolutional neural network.

B13. The vehicle fault detection system of paragraph B1, wherein the at least one deep learning model comprises a stacked auto-encoder.

B14. The vehicle fault detection system of paragraph B1, wherein at least one of (or each of) the at least one time series of numerical sensor data corresponds to a whole vehicle excursion and the analysis image corresponds to the at least one time series of numerical sensor data for the whole vehicle excursion.

B15. The vehicle fault detection system of paragraph B1, wherein the vehicle control module is configured to identify relationships between more than one system parameter based on the analysis image of at least one system parameter.

B16. The vehicle fault detection system of paragraph B1, further comprising a vehicle interlock coupled with the vehicle control module, the vehicle interlock being configured to prevent an operation of the vehicle based on a detection of the anomalous behavior.

B17. The vehicle fault detection system of paragraph B1, wherein the vehicle control module is further configured to predict a failure of a component of the vehicle system based on the anomalous behavior of the respective system parameter and the user interface is further configured to present prediction of the failure to the operator.

C1. A method for vehicle fault detection, the method comprising:

generating, with at least one sensor coupled to a vehicle system, at least one time series of numerical sensor data for a respective system parameter of the vehicle system being monitored;

transforming, with a vehicle control module coupled to the at least one sensor, the at least one time series of numerical sensor data for the respective system parameter into an analysis image of at least one system parameter;

detecting, with at least one deep learning model of the vehicle control module, anomalous behavior of the respective system parameter based on the analysis image of at least one system parameter; and displaying, on a user interface coupled to the vehicle control module, an indication of the anomalous behavior of the respective system parameter.

C2. The method of paragraph C1, wherein at least one of (or each of) the at least one time series of numerical sensor data corresponds to a respective system parameter of a vehicle system being monitored.

C3. The method of paragraph C1, wherein the vehicle is one of an automotive vehicle, a maritime vehicle, and an aerospace vehicle.

C4. The method of paragraph C1, wherein the vehicle is an aircraft.

C5. The method of paragraph C1, wherein the analysis image of at least one system parameter is common to more than one time series of numerical sensor data.

C6. The method of paragraph C1, wherein the at least one deep learning model includes respective deep learning models corresponding to different predetermined vehicle operating conditions and the anomalous behavior for a component of the vehicle system is detected with the respective deep learning models depending on the predetermined vehicle operating condition.

C7. The method of paragraph C6, wherein the respective predetermined vehicle operating condition comprises one or more of a flight duration and weather conditions.

C8. The method of paragraph C1, further comprising training the at least one deep learning model, with the vehicle control module, by:

receiving at least one historical time series of numerical sensor data from at least one historical vehicle excursion, the at least one historical time series of numerical sensor data corresponds to the respective system parameter of the vehicle system being monitored, generating a graphical representation for the at least one historical time series of numerical sensor data for a respective historical vehicle excursion to form a training image of at least one system parameter, and labeling the training image of at least one system parameter for the respective historical vehicle excursion as being one of anomalous or ordinary.

C9. The method of paragraph C8, wherein the training image of at least one system parameter is common to more than one historical time series of numerical sensor data from the at least one historical vehicle excursion.

C10. The method of paragraph C8, wherein at least one of (or each of) the at least one historical vehicle excursion is a flight of the vehicle.

C11. The method of paragraph C1, wherein the at least one deep learning model comprises a convolutional neural network.

C12. The method of paragraph C1, wherein the at least one deep learning model comprises a stacked auto-encoder.

C13. The method of paragraph C1, wherein at least one of (or each of) the at least one time series of numerical sensor data corresponds to a whole vehicle excursion and the analysis image corresponds to the at least one time series of numerical sensor data for the whole vehicle excursion.

C14. The method of paragraph C 1, further comprising identifying, with the vehicle control module, relationships between more than one system parameter based on the analysis image of at least one system parameter.

C15. The method of paragraph C1, further comprising preventing an operation of the vehicle, with a vehicle interlock coupled with the vehicle control module, based on a detection of the anomalous behavior.

C16. The method of paragraph C1, further comprising:
predicting, with the vehicle control module, a failure of a component of the vehicle system based on the anomalous behavior of the respective system parameter; and
displaying, on the user interface, prediction of the failure.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 10, 11, and 13, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 10, 11, and 13 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es), system(s), and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different

What is claimed is:

1. An aircraft fault detection system comprising:
   at least one sensor configured for coupling with an aircraft system; and
   a control module that is coupled to the at least one sensor and that includes a deep learning module, the control module being configured to
   obtain at least one historical time series of numerical sensor data that corresponds to a respective system parameter of the aircraft system being monitored,
   generate more than one labeled training image from the at least one historical time series of numerical sensor data, the more than one labeled training image includes graphical representations of the at least one historical time series of numerical sensor data that are labeled as anomalous training images and ordinary training images,
   train the deep learning module with the more than one labeled training image so that the deep learning module learns to identify the anomalous training images and the ordinary training images,
   generate an analysis image that includes a graphical representation for at least one time series of numerical sensor data, obtained from the at least one sensor, corresponding to at least one system parameter,
   detect, with the deep learning module, anomalous behavior of a component of the aircraft system based on an image graphic comparison analysis of the graphical representation of the at least one system parameter with knowledge learned by the training of the deep learning module with the anomalous training images and the ordinary training images, and
   facilitate a presentation of an indication of the anomalous behavior for the component of the aircraft system.

2. The aircraft fault detection system of claim 1, wherein the control module is further configured to:
   predict a failure of the component of the aircraft system based on the anomalous behavior of the component of the aircraft system; and
   facilitate presentation of prediction of the failure of the component of the aircraft system.

3. The aircraft fault detection system of claim 1, wherein the analysis image is a graphical representation of more than one time series of numerical sensor data.

4. The aircraft fault detection system of claim 1, wherein the deep learning module includes at least one deep learning model having a neural network configured to detect the anomalous behavior for the component of the aircraft system.

5. The aircraft fault detection system of claim 4, wherein the at least one deep learning model includes more than one deep learning model configured to detect the anomalous behavior for the component of the aircraft system depending on a respective predetermined aircraft operating condition.

6. The aircraft fault detection system of claim 1, wherein the control module is configured to combine the analysis image of one of the at least one system parameter with an analysis image of at least another of the at least one system parameter to graphically represent relationships between more than one system parameter based on the analysis image.

7. The aircraft fault detection system of claim 1 wherein, the at least one historical time series of numerical sensor data corresponds to a whole aircraft excursion and the graphical representations of the at least one historical time series of numerical sensor data correspond to the at least one historical time series of numerical sensor data for the whole aircraft excursion.

8. An aircraft fault detection system comprising:
   a memory; and
   a control module coupled to the memory, the control module includes at least one deep learning module and is configured to
   obtain at least one historical time series of numerical sensor data that corresponds to a respective system parameter of an aircraft system, of an aircraft, being monitored,
   transform the at least one historical time series of numerical sensor data into more than one labeled training image, the more than one labeled training image includes graphical representations of the at least one historical time series of numerical sensor data that are labeled as anomalous training images and ordinary training images,
   train the at least one deep learning module with the more than one labeled training image so that the at least one deep learning module learns to identify the anomalous training images and the ordinary training images,
   transform at least one time series of numerical sensor data, obtained from at least one sensor, for the respective system parameter of the aircraft system being monitored into an analysis image that includes a graphical representation of at least one system parameter, and
   detect, with the at least one deep learning model, anomalous behavior of the respective system parameter based on an image graphic comparison analysis of the graphical representation of the at least one system parameter with knowledge learned by the training of the at least one deep learning module with the anomalous training images and the ordinary training images; and
   facilitate presentation of an indication of the anomalous behavior of the respective system parameter.

9. The aircraft fault detection system of claim 8, wherein the control module is further configured to:
   predict a failure of a component of the aircraft system based on the anomalous behavior of the respective system parameter; and
   facilitate presentation of prediction of the failure of the component of the aircraft system.

10. The aircraft fault detection system of claim 8, wherein the control module is configured to access the at least one time series of numerical sensor data from the memory, at least one of the at least one time series of numerical sensor data corresponds to a respective system parameter of an aircraft system being monitored.

11. The aircraft fault detection system of claim 8, wherein the at least one deep learning model includes more than one deep learning model configured to detect the anomalous behavior for a component of the aircraft system depending on a respective predetermined aircraft operating condition.

12. The aircraft fault detection system of claim 8, wherein the control module is further configured to train the at least one deep learning model by:
- receiving at least one historical time series of numerical sensor data from at least one historical aircraft excursion, the at least one historical time series of numerical sensor data corresponds to the respective system parameter of the aircraft system being monitored,
- generating a graphical representation for the at least one historical time series of numerical sensor data for a respective historical aircraft excursion to form a training image of at least one system parameter, and
- labeling the training image of at least one system parameter for the respective historical aircraft excursion as being one of anomalous or ordinary.

13. The aircraft fault detection system of claim 12, wherein the training image of at least one system parameter is a graphical representation of more than one historical time series of numerical sensor data from the at least one historical aircraft excursion.

14. The aircraft fault detection system of claim 12, wherein at least one of the at least one historical aircraft excursion is a flight of the aircraft from airport departure gate to airport arrival gate.

15. The aircraft fault detection system of claim 8, wherein the at least one deep learning model comprises one or more of a convolutional neural network and a stacked autoencoder.

16. A method for aircraft fault detection, the method comprising:
- obtaining, with a control module, at least one historical time series of numerical sensor data that corresponds to a respective system parameter of an aircraft system, of an aircraft, being monitored, the control module including at least one deep learning module;
- generating more than one labeled training image from the at least one historical time series of numerical sensor data, the more than one labeled training image includes graphical representations of the at least one historical time series of numerical sensor data that are labeled as anomalous training images and ordinary training images;
- training, with the control module, the at least one deep learning module with the more than one labeled training image so that the at least one deep learning module learns to identify the anomalous training images and the ordinary training images,
- transforming, with the control module, at least one time series of numerical sensor data, received from at least one sensor of the aircraft system, for the respective system parameter into an analysis image that includes a graphical representation of at least one system parameter;
- detecting, with at least one deep learning model of the control module, anomalous behavior of the respective system parameter based on an image graphic comparison analysis of the graphical representation of the at least one system parameter; and
- facilitating a presentation of an indication of the anomalous behavior of the respective system parameter.

17. The method of claim 16, further comprising:
- predicting, with the control module, a failure of a component of the aircraft system based on the anomalous behavior of the respective system parameter; and
- facilitating presentation of prediction of the failure of the component of the aircraft system.

18. The method of claim 16 wherein, the at least one historical time series of numerical sensor data corresponds to a whole aircraft excursion and the graphical representations of the at least one historical time series of numerical sensor data correspond to the at least one historical time series of numerical sensor data for the whole aircraft excursion.

19. The method of claim 18, wherein the whole aircraft excursion comprises is a flight of the aircraft from an airport departure gate to an airport arrival gate.

20. The method of claim 16, further comprising combining, with the control module, the analysis image of the respective system parameter with another analysis image of another system parameter to graphically represent relationships between more than one system parameter based on the analysis image.

* * * * *